(12) United States Patent
Kondo et al.

(10) Patent No.: US 7,564,993 B2
(45) Date of Patent: *Jul. 21, 2009

(54) PERSONAL AUTHENTICATION METHOD AND DEVICE

(75) Inventors: Kenji Kondo, Osaka (JP); Kenya Uomori, Osaka (JP)

(73) Assignee: Panasonic Corporation, Osaka (JP)

( * ) Notice: Subject to any disclaimer, the term of this patent is extended or adjusted under 35 U.S.C. 154(b) by 188 days.

This patent is subject to a terminal disclaimer.

(21) Appl. No.: 11/429,570

(22) Filed: May 5, 2006

(65) Prior Publication Data

US 2006/0210123 A1 Sep. 21, 2006

Related U.S. Application Data

(63) Continuation of application No. 10/084,107, filed on Feb. 27, 2002, now Pat. No. 7,099,495.

(30) Foreign Application Priority Data

Feb. 28, 2001 (JP) ............... 2001-053602

(51) Int. Cl.
*G06K 9/00* (2006.01)
(52) U.S. Cl. ..................................... 382/117
(58) Field of Classification Search ............... 382/117
See application file for complete search history.

(56) References Cited

U.S. PATENT DOCUMENTS

| | | | |
|---|---|---|---|
| 3,993,976 A | 11/1976 | Ginsburg | |
| 5,291,560 A | 3/1994 | Daugman | |
| 5,294,560 A | 3/1994 | Ono et al. | |
| 6,122,042 A | 9/2000 | Wunderman et al. | |
| 6,317,544 B1 * | 11/2001 | Diehl et al. | 385/115 |
| 6,628,809 B1 | 9/2003 | Rowe et al. | |
| 2002/0181749 A1 | 12/2002 | Matsumoto et al. | |

FOREIGN PATENT DOCUMENTS

| | | |
|---|---|---|
| DE | 19929671 A1 | 1/2001 |
| EP | 0973122 A2 | 1/2000 |

(Continued)

OTHER PUBLICATIONS

Wildes, R.P., "Iris recognition: an emerging biometric technology," Proceedings of the IEEE, vol. 85, No. 9, pp. 1348-1363, Sep. 1997.*

(Continued)

*Primary Examiner*—Matthew C Bella
*Assistant Examiner*—Hadi Akhavannik
(74) *Attorney, Agent, or Firm*—Harness, Dickey & Pierce, P.L.C.

(57) ABSTRACT

During registration, an iris image taken is frequency-analyzed using a plurality of frequencies f1 to fn to generate features for the respective frequencies f1 to fn. During authentication, frequencies f2 to fn are selected from the frequencies f1 to fn for use in frequency analysis for authentication. An iris image of a person to be authenticated taken is frequency-analyzed using the selected frequencies f2 to fn to generate features for the respective frequencies f2 to fn. The generated features are compared with the features generated for the same frequencies during the registration to perform personal authentication.

13 Claims, 18 Drawing Sheets

FOREIGN PATENT DOCUMENTS

| JP | 63-136177 | 6/1988 |
|----|-----------|--------|
| JP | 04-326481 | 11/1992 |
| JP | 8-504979 | 5/1996 |
| WO | WO-94/09446 | 4/1994 |
| WO | WO-00/62239 | 10/2000 |

OTHER PUBLICATIONS

Zhou, Guojun / Hansen, John H. L. / Kaiser, James F. (1998): "A new nonlinear feature for stress classification", In NORSIG-1998, 89-92.*

Bovik, A.C.; Clark, M.; Geisler, W.S., "Multichannel texture analysis using localized spatial filters," Pattern Analysis and Machine Intelligence, IEEE Transactions on, vol. 12, No. 1, pp. 55-73, Jan. 1990.*

Koichi Nijima; "Wavelet Image Analysis"; Kagaku Gijutu Publishing Co., Ltd.; pp. 289-306; and partial English translation.

Cooke, M. et al.; "Missing Data Techniques for Robust Speech Recognition"; 1997 IEEE International Conference on Acoustics, Speech and Signal Processing (Cat. No. 97CB36052) IEEE Comput. Soc. Press; Los Alamitos, CA, USA; vol. 2, 1997; pp. 863-866; vol. 2; XP002305684.

Bourlard, H. et al.; "A New ASR Approach Based on Independent Processing and Recombination of partial Frequency Bands"; Proceedings ICSLP 96; Fourth International Conference on Spoken Language Processing (Cat. No. 96TH8206); IEEE New York, NY, USA; vol. 1, 1996; pp. 426-429; vol. 1; XP002305685.

Boles, W. W.; "A Wavelet Transform Based Technique for the Recognition of the Human Iris"; International Symposium on Signal Processing and its Application; Proceedings, XX, XX; vol. 2, Aug. 25, 1996; pp. 601-604; XP010241084.

"Two-Dimensional spectral analysis of cortical receptive field profiles"; (written by John Daugman. Article written in Vision Research, vol. 20, pp. 847-856).

Uncertainty relation for resolution in space, spatial frequency, and orientation optimized by two-dimensional visual cortical filters (written by John Daugman. Article written in Journal of the Optical Society of America, vol. 2(7), pp. 1160-1169).

* cited by examiner

PERSONAL AUTHENTICATION METHOD AND DEVICE

CROSS-REFERENCE TO RELATED APPLICATIONS

This application is a continuation of U.S. patent application Ser. No. 10/084,107 filed on Feb. 27, 2002 which claims the benefit of Japanese Patent Application No. 2001-053602 filed Feb. 28, 2001. The disclosure(s) of the above application(s) are incorporated herein by reference.

BACKGROUND OF THE INVENTION

The present invention relates to a technology of personal authentication in which features are obtained from biological information by frequency analysis and personal authentication is performed based on the similarity between the features.

As individual identification techniques using human biological information (biometrics), there have been proposed many methods using information of fingerprints, irises, blood-vessel arrangements in the retinas, faces, and the like. Among these, individual identification using an iris, in particular, is expected to be mainstream of biometrics authentication in the future for the reasons that:

(1) an iris pattern can be acquired with a camera in a noncontact manner, (2) the false acceptance rate (FAR) is significantly low due to complexity of the iris pattern, and (3) the iris pattern remains unchanged substantially through the life of the owner.

Techniques for extracting iris features from iris images and identifying individuals are disclosed in U.S. Pat. No. 5,291,560, Japanese National Phase PCT Laid-Open Publication No. 8-504979, and "High Confidence Visual Recognition of Persons by a Test of Statistical Independence", IEEE Transactions on Pattern Analysis and Machine Intelligence, Vol. 15, No. 11, November 1993 (these three disclosures are roughly the same in contents).

In the above techniques, an iris image is analyzed at multiple resolutions using multi-scale self-similarity type two-dimensional quadrature band-pass filters (Gabor filters, for example) to generate a feature (iris code). To state as a specific procedure, a digitized image of a human eye is captured with a video camera, and the boundary between the iris and the sclera and the boundary between the iris and the pupil are determined to separate an iris region from others. A polar coordinate system is applied to the separated iris image, and a plurality of ring analysis bands are determined. Analysis and coding are then performed for the analysis bands using a signal processor comprised of multi-scale quadrature band-pass filters. The thus-generated iris codes are compared with each other by calculating a hamming distance between the codes as shown in FIG. 24, to determine whether or not the compared iris codes originate from an identical person.

PROBLEMS TO BE SOLVED

The above technique is based on the premise that multi-scale frequency analysis is performed for predetermined fixed frequency bands using an image capture device providing a predetermined fixed resolution in both cases of iris registration and comparison. To fulfill this premise, dedicated registration and authentication devices are necessary.

In view of the recent sophistication in function of cellular phones and personal digital assistants (PDAs), increase in capacity of communication bands, and the like, the following use of personal authentication is considered possible in the near future. That is, a cellular phone or PDA equipped with an image capture device (camera) may be used for taking an iris image of a person and authenticating the person. And this capability may be utilized in occasions of access control, such as logging in to a cellular phone or PDA, authentication in electronic commerce (EC), control of entrance/exit into/from a place requiring physical security, and alternative use to a key of a house. When the above occasions are to be realized, an image capture device incorporated in or mounted externally on a cellular phone or PDA will possibly be comparatively low in resolution at the beginning. In addition, specifications for image capture devices will possibly be different among the types of the devices. Moreover, it is considered that authentication will be effected via a variety of apparatuses such as a terminal mounted on the door, not only a cellular phone and a PDA.

As described above, an iris image may be taken with a variety of apparatuses providing lower to higher resolutions during authentication. Under this situation, if frequency analysis is performed at fixed frequency bands by the conventional method described above, the following problem will arise. That is, when a low-resolution image is input, a part of a feature obtained by analysis at a high frequency (specifically, a frequency component equal to or higher than Fs/2 where Fs is a sampling frequency) is no more useful as the feature. Therefore, if this part obtained by high-frequency analysis is counted as part of the feature, the entire correlation value decreases and thus authentication precision possibly degrades.

SUMMARY OF THE INVENTION

The object of the present invention is providing personal authentication method and device using biological information, capable of suppressing degradation in authentication precision to maintain adequate authentication precision even in a future environment of using a variety of apparatuses for authentication, for example.

To state specifically, the present invention is directed to a personal authentication method using biological information. According to the method, during registration, acquired biological information is frequency-analyzed using a plurality of frequencies to generate a feature for each frequency and register the feature, and the method includes the steps of: selecting a frequency used for frequency analysis for authentication from the plurality of frequencies; performing frequency analysis for acquired biological information of a person to be authenticated using the selected frequency to generate a feature for the frequency; and comparing the generated feature with the feature generated for the same frequency during the registration to perform personal authentication.

According to the invention described above, a frequency used for frequency analysis during authentication is selected from a plurality of frequencies used for frequency analysis during registration. By this selection, a frequency component that may possibly reduce the entire correlation value and is unwanted from the aspect of authentication precision, for example, can be eliminated. This suppresses degradation in authentication precision.

The biological information is preferably an image of an iris of an eye.

The selection of the frequency during the authentication in the personal authentication method of the present invention is preferably performed based on a resolution of an iris image taken during the authentication. The resolution of the iris image is preferably determined from the iris image itself. Alternatively, it may be determined based on the length of a circumference corresponding to the boundary between the iris and the pupil of the iris image, or may be determined from information on an apparatus with which the iris image was taken.

The selection of the frequency during the authentication in the personal authentication method of the present invention is preferably performed based on authentication precision for each combination of the plurality of frequencies. The authentication precision is preferably calculated using a distribution of authentication scores (ex. distances) between identical persons and a distribution of authentication scores between different persons.

The authentication precision during the authentication in the personal authentication method of the present invention is preferably estimated from the selected frequency. The authentication precision may be estimated using a distribution of authentication distances between identical persons and a distribution of authentication distances between different persons. Whether or not the person to be authenticated should be finally authenticated may be judged according to the estimated authentication precision. A right to be bestowed on the person to be authenticated after the authentication may be controlled, or whether or not re-authentication is performed may be judged, according to the estimated authentication precision.

In another aspect, the present invention is directed to a personal authentication device using biological information. During registration, acquired biological information is frequency-analyzed using a plurality of frequencies to generate a feature for each frequency and register the feature, and the device includes: means for selecting a frequency used for frequency analysis for authentication from the plurality of frequencies; means for performing frequency analysis for acquired biological information of a person to be authenticated using the selected frequency to generate a feature for the frequency; and means for comparing the generated feature with the feature generated for the same frequency during the registration to perform personal authentication.

The biological information is preferably an image of an iris of an eye.

DESCRIPTION OF THE PREFERRED EMBODIMENTS

Hereinafter, preferred embodiments of the present invention will be described with reference to the accompanying drawings. In the following description, iris authentication, that is, personal authentication using an image of an iris of an eye, is exemplified. It should however be noted that the present invention is also applicable to other types of personal authentication using other biological information such as a fingerprint and a voiceprint.

Embodiment 1

Figure 1:
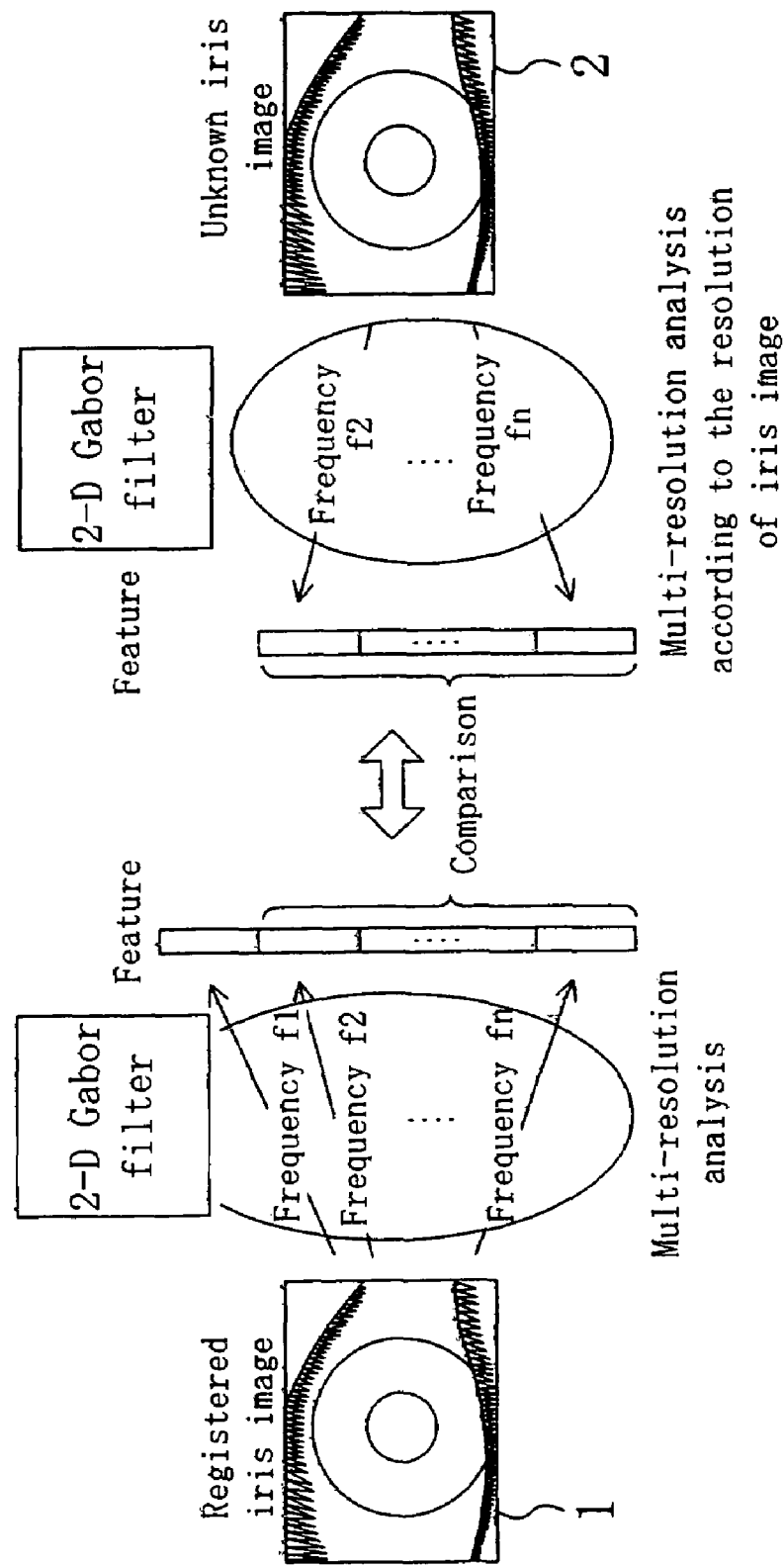
FIG. 1 is a conceptual illustration of technical features of a personal authentication method of Embodiment 1 of the present invention.

FIG. 1 is a conceptual illustration of technical features of a personal authentication method of Embodiment 1 of the present invention. As shown in FIG. 1, in this embodiment, during registration, frequency analysis at a plurality of frequencies f1 to fn is performed for an iris image 1 taken, and features are generated for the respective frequencies f1 to fn. During authentication, the frequencies f2 to fn among the plurality of frequencies f1 to fn used during the registration are selected for use in frequency analysis for authentication based on the resolution of an iris image 2 taken. Frequency analysis at the selected frequencies f2 to fn is performed for the iris image 2 of a person to be authenticated, to generate features for the respective frequencies f2 to fn. The generated respective features are compared with those for the same frequencies obtained during the registration, to perform personal authentication.

By adopting the method described above, even when an iris image of a person to be authenticated is taken with an image capture device providing a resolution lower than that used during the registration, personal authentication can be performed using this lower-resolution iris image. In addition, since a feature for a non-selected frequency, which is useless as a feature, is eliminated, degradation in authentication precision can be suppressed in the personal authentication.

Figure 2:
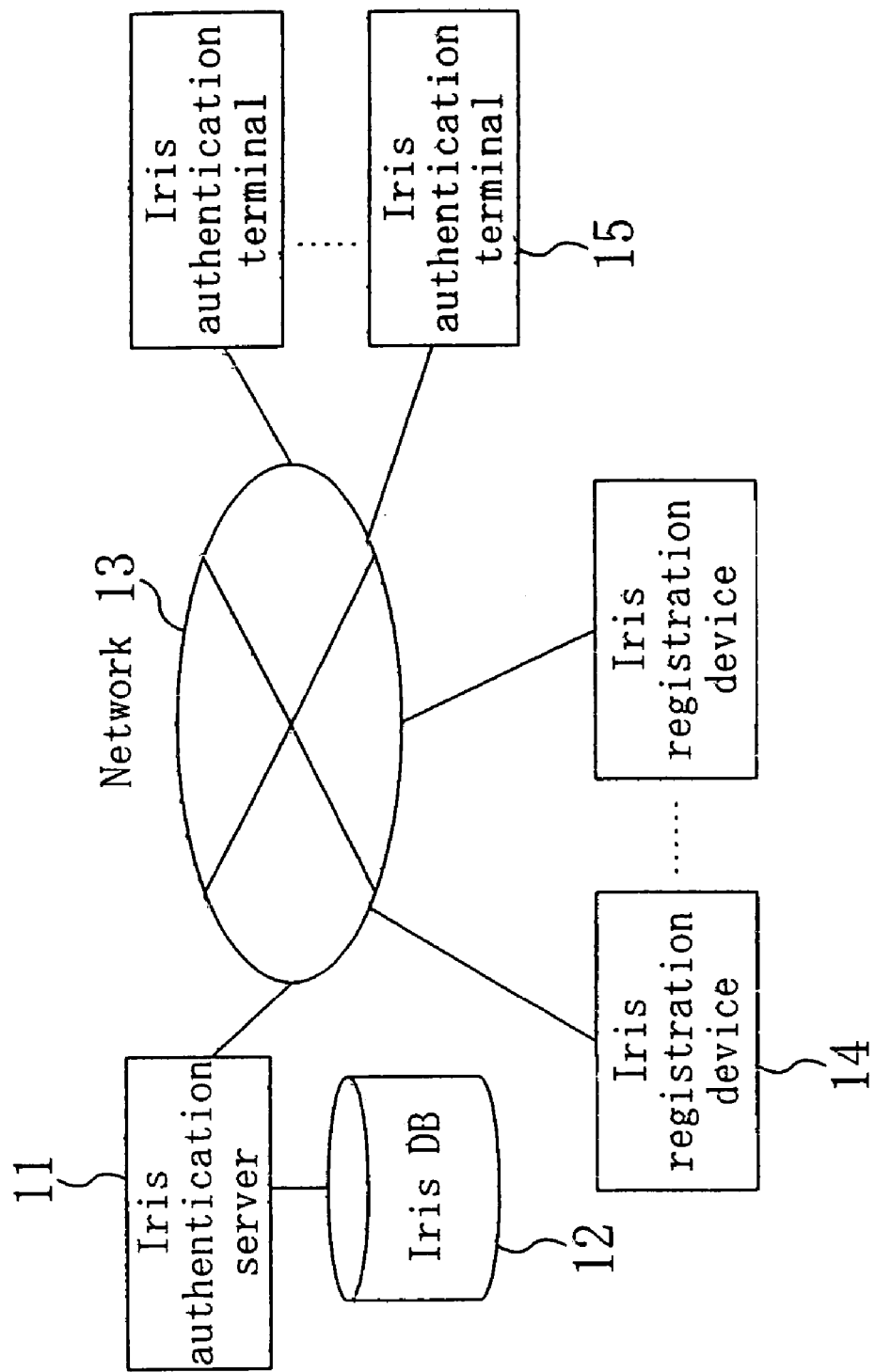
FIG. 2 is a schematic block diagram of a personal authentication system of the embodiments of the present invention.

FIG. 2 is a schematic diagram of a personal authentication system of this embodiment. Referring to FIG. 2, an iris authentication server 11 has an iris database (DB) 12 storing iris data of a plurality of persons and is connected to a network 13 such as the Internet, private lines and public lines. At least one Iris registration device 14 and at least one iris authentication terminal 15, which are provided with an image capture device, are connected to the network 13.

Figure 3:
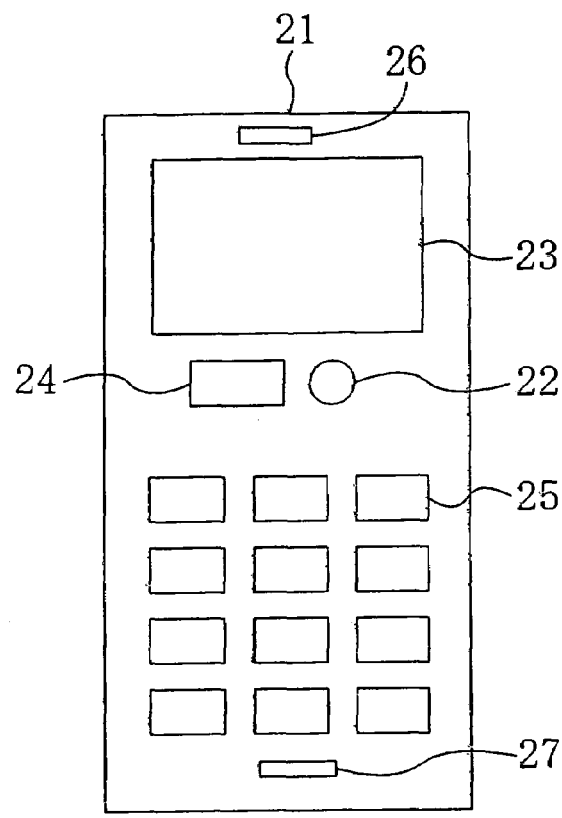
FIG. 3 is an illustration of an appearance of a camera-equipped cellular phone as an iris authentication terminal.
Figure 4:
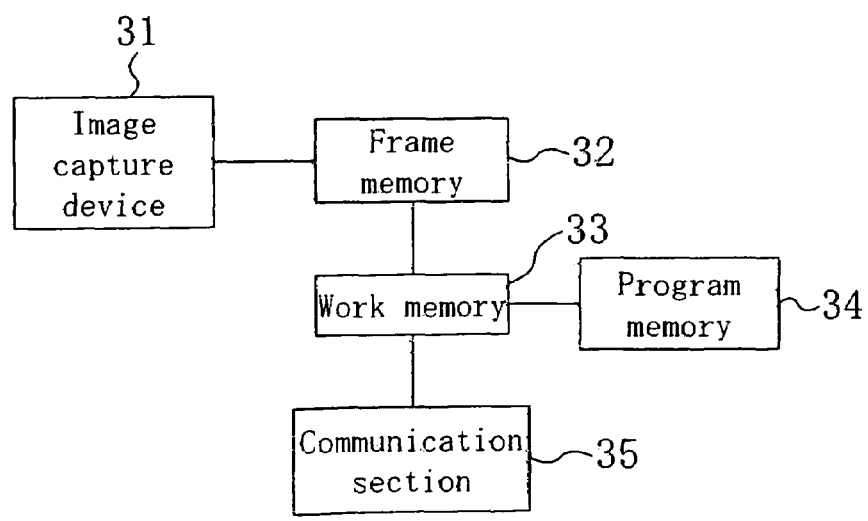
FIG. 4 is a block diagram of an internal configuration of the iris authentication terminal.

FIG. 3 is an illustration of a camera equipped cellular phone 21 applied as the iris authentication terminal 15 of the iris authentication system shown in FIG. 2. FIG. 4 is a block diagram of an inner configuration of the iris authentication terminal 15.

A plurality of iris authentication servers 11 may be provided, for placement in each area or organization using the network and/or for placement of mirror servers for dispersing the load. The iris DB 12 may be connected to the iris authentication server via the network.

The function of the iris registration device 14 may be incorporated in the iris authentication server 11, or the iris authentication terminal 15 may have both functions of registration and authentication. When a plurality of iris authentication terminals 15 are provided, the image capture specifications for the terminals are not necessarily the same.

Figure 5:
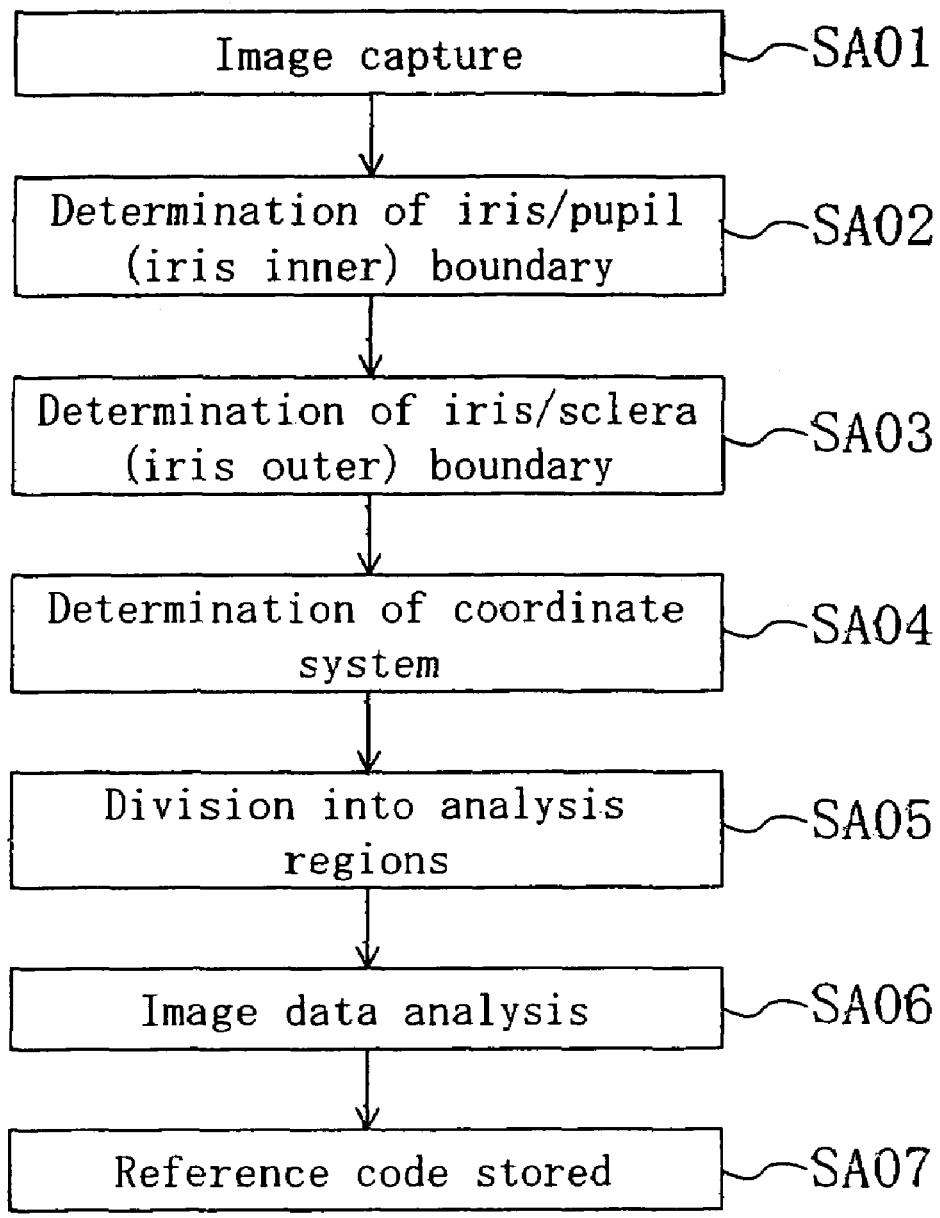
FIG. 5 is a flowchart of processing during registration in the personal authentication method of Embodiment 1 of the present invention.
Figure 6:
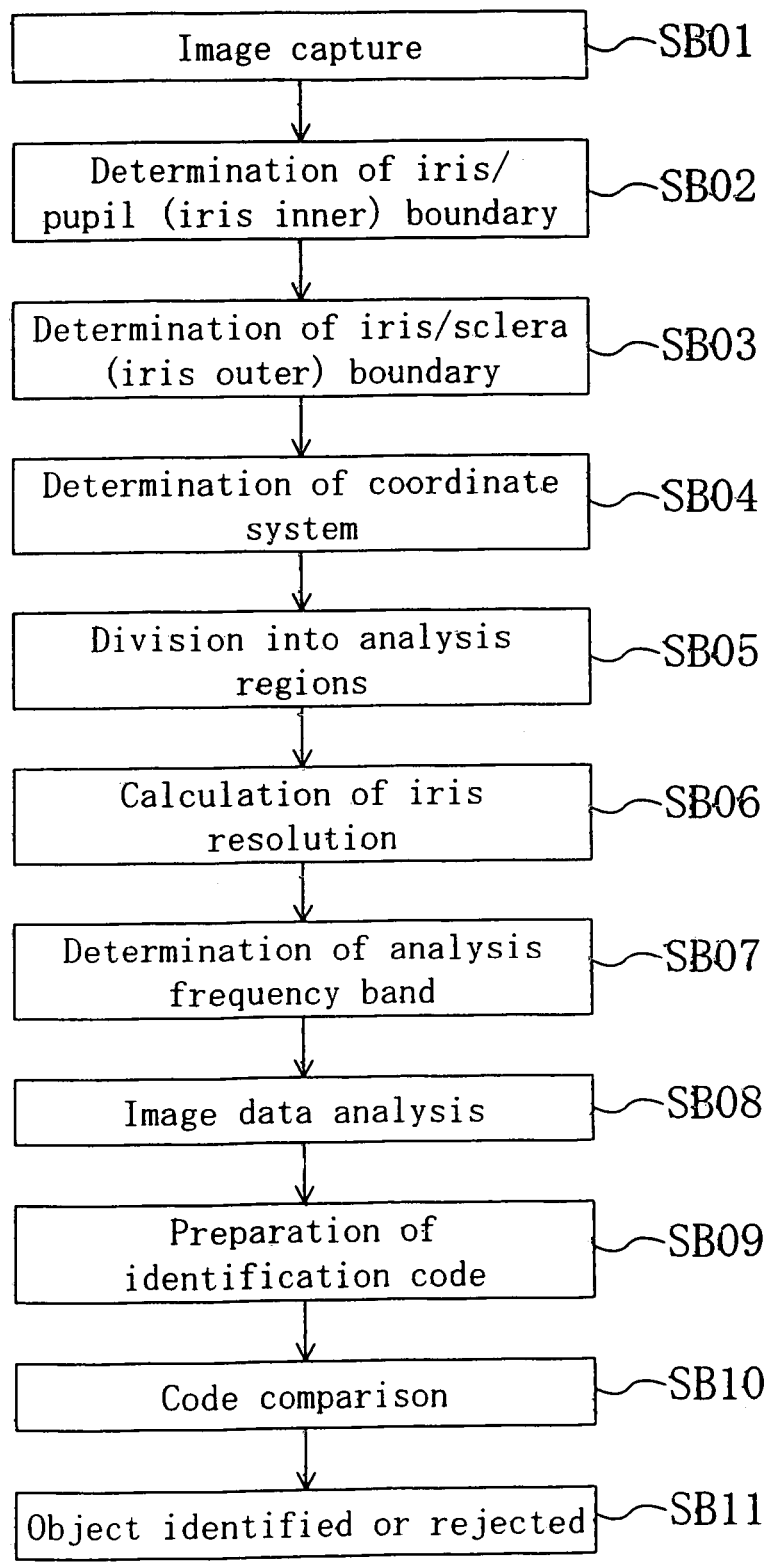
FIG. 6 is a flowchart of processing during authentication in the personal authentication method of Embodiment 1 of the present invention.

FIGS. 5 and 6 are flowcharts of processing during registration and that during authentication, respectively, in the personal authentication method of this embodiment. Hereinafter, the processing during registration and that during authentication in the personal authentication method of this embodiment will be described separately.

<Registration>

During registration, in step SA01 for image capture, an iris image is taken with the iris registration device 14 at a "resolution" adequate to capture fine details of the iris pattern. The "resolution" as used herein refers to "how finely the iris was sampled", which may also be called the resolving power. An image capture device/lens system incorporated in the iris registration device 14 should be the one capable of taking an iris image at an adequate resolution.

Figure 7:
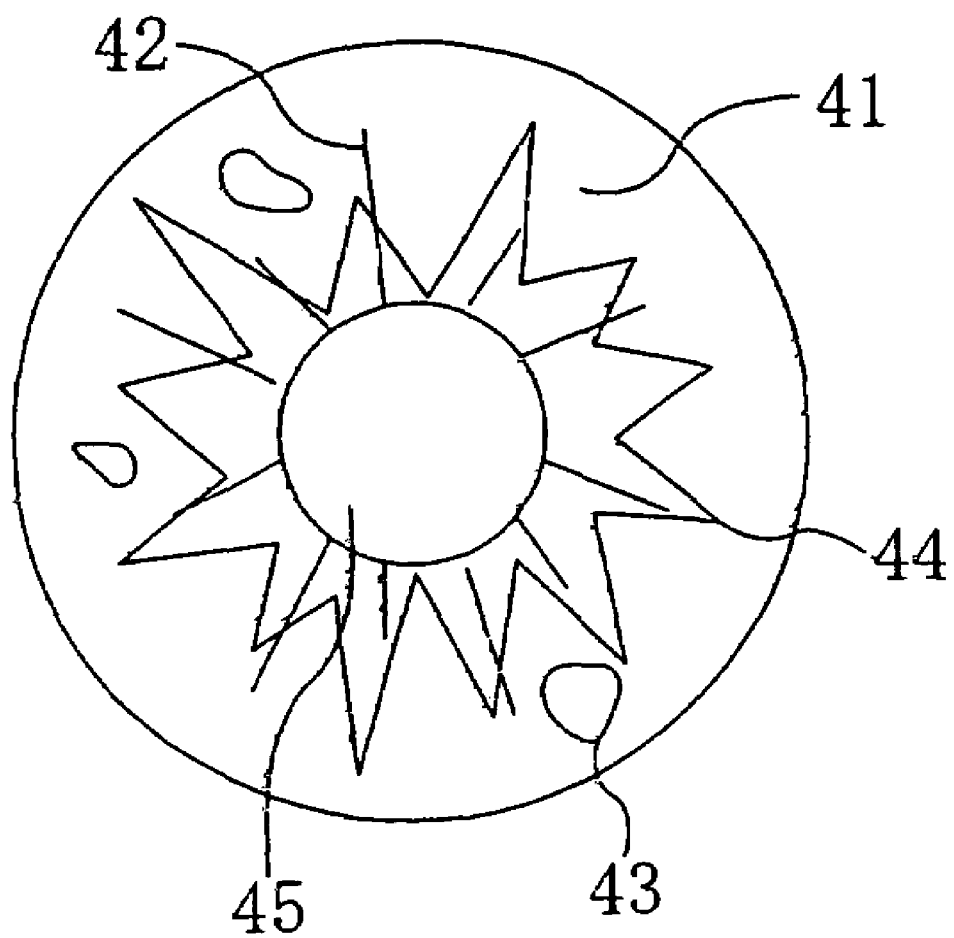
FIG. 7 is an illustration of a structure of an iris.

FIG. 7 illustrates a structure of an iris. Referring to FIG. 7, an iris 41 mainly includes folds 42 (a pattern extending radially from around the boundary with a pupil 45), iris pits 43, an iris frill 44, and the like. The pattern of the iris 41 differs among individuals. Personal authentication is realized using this difference in pattern, in which a feature is extracted from the pattern of the iris 41 and the extracted feature is compared with others.

Figure 8:
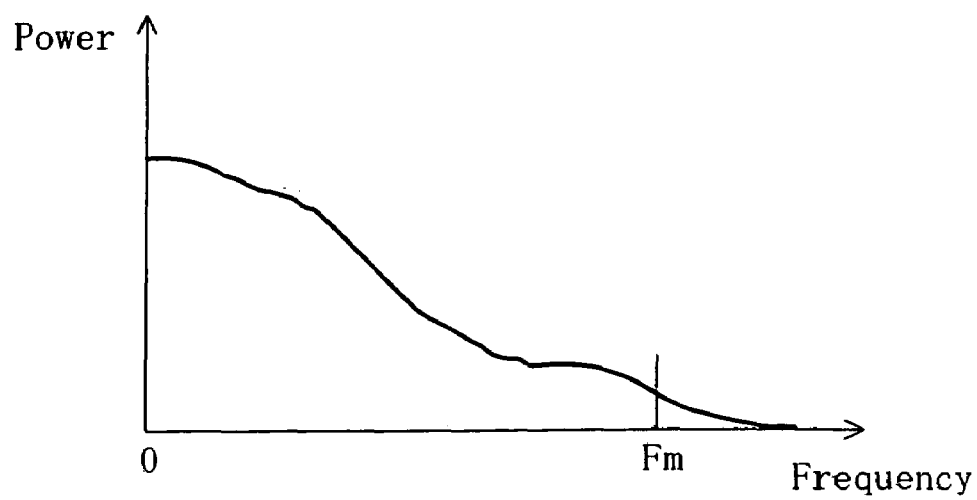
FIG. 8 is a view representing an iris pattern in terms of the frequency range using Fourier transform.

FIG. 8 is a view representing the iris pattern in terms of the frequency range using Fourier transform. Although 2D Fourier transform is actually used since the actual iris pattern is a two-dimensional image, one-dimensional representation is shown in FIG. 8 for simplification of description. The one dimension in this case is a dimension in the circumferential direction of a two-dimensional iris pattern obtained by separating from other portions in a manner described later and applying polar coordinates. That is, to state differently, a radial pattern of the iris such as the pattern of the folds 42 is frequency-analyzed in the circumferential direction. The reason why the frequency analysis is performed in the circumferential direction is that the radial pattern of the iris is known important for personal authentication.

In this embodiment, the frequency of a sine wave of which one period covers 360 degrees in a circumferential direction (one cycle) is expressed as frequency 1 (the unit of the frequency is Hz, which is also applicable to the rest of the description).

In FIG. 8, Fm represents the upper-limit frequency of a frequency band effective in use of the iris pattern for authentication. According to the sampling theorem, in order to use the upper-limit frequency Fm for analysis of the iris pattern, an iris image should be captured at a sampling frequency Fs=Fm×2 or higher. By this capture, the "adequate resolution" described above is obtained. Alternatively, the upper-limit frequency Fm may be determined by capturing iris images at various sampling frequencies Fs in preliminary experiments and selecting a sampling frequency Fs at which the highest recognition performance is exhibited. Otherwise, the upper-limit frequency Fm may be estimated from gaps between the finest wrinkles observable obtained by observing iris patterns of various persons.

The iris image taken during the registration is sent to the iris authentication server 11 via the network 13, together with the ID of the person concerned obtained separately. Note that if there is available an iris authentication terminal 15 provided with the ability of taking an iris image at an adequate resolution, registration of an iris image can also be performed using such a terminal 15.

In steps SA02 to SA07, a feature (iris code) used for authentication is extracted from the iris image taken. Note that although the iris authentication server 11 performs the extraction of a feature in this embodiment, the iris registration device 14 may perform a series of processing from capturing of an iris image through extraction of a feature, and send the generated iris code via the network 13 to be stored in the iris DB 12.

Steps SA02 to SA05 can be implemented by any method as long as the iris region can be extracted stably. In this embodiment, the method described in Japanese National Phase PCT Laid-Open Publication No. 8-504979 is employed. Details of this method are omitted here, and only the outline is described as follows.

In step SA02, the inner boundary of the iris is first determined for extraction of the iris region. More specifically, utilizing the fact that the brightness is different between the pupil and the iris, a circle in which the integral of the brightness abruptly changes on the circumference is sought among circles having regularly increasing radii, and the center (x0, y0) and the radius r0 of the circle are obtained.

Likewise, in step SA03, the outer boundary of the iris is determined. In this step, also, the fact that the brightness is different between the iris and the sclera is utilized. In this case, since the boundary between the iris and the sclera is often occluded by the upper eyelid and the lower eyelid, calculation of the integral of the brightness is made for only the right and left arc portions (called "pie wedges" in the above publication) excluding the upper and lower portions of the circle. In other words, a circle in which the integral of the brightness at the pie wedges abruptly changes is sought among circles having regularly increasing radii, and the center (x1, y1) and the radius r1 of the circle are obtained.

Thus, from steps SA02 and SA03, the inner and outer boundaries of the iris are determined, and thus the iris region is extracted.

In step SA04, a polar coordinate system is applied to the extracted iris region. The origin of the polar coordinate system is set at the center (x0, y0) of the pupil. In the dimension in the radial direction, the circumference of the pupil (that is, the innermost radius of the iris) is determined as radius 0 while the circumference of the iris (that is, the outermost radius of the iris) is determined as radius 1. In-between values of the radius are linearly interpolated between 0 and 1 depending on the distance from the pupil circumference to the iris circumference. In the dimension in the angular direction, values between 0 and 360 degrees are determined. Thus, although the size of the iris image varies with the difference in iris size among individuals, the zoom value of a camera, the distance between the camera and the iris, and the like, extraction of a feature from the iris image can be performed without being influenced by the iris size by setting the polar coordinate system described above.

In step SA05, the iris region is divided into a plurality of concentric ring regions (for example, eight regions).

In step SA06, as disclosed in the above publication, the polar coordinates-applied iris image is subjected to 2D Gabor filters, which are multi-scale band-pass filters. The Gabor filter is represented by the following expression.

$$G(r,\theta) = e^{2\pi j \omega (\theta - \theta_0)} e^{-(r-r_0)^2/\alpha^2} e^{-(\theta-\theta_0)/\beta^2} \quad (1)$$

where r is the radius, θ is a radial angle, ω is the angular frequency, and α and β are constants. The parameters α and β vary inversely with the angular frequency ω. Herein, a plurality of angular frequencies ω are prepared, and analysis of the iris image is performed using a plurality of Gabor filters corresponding to the respective angular frequencies ω.

Figure 9:
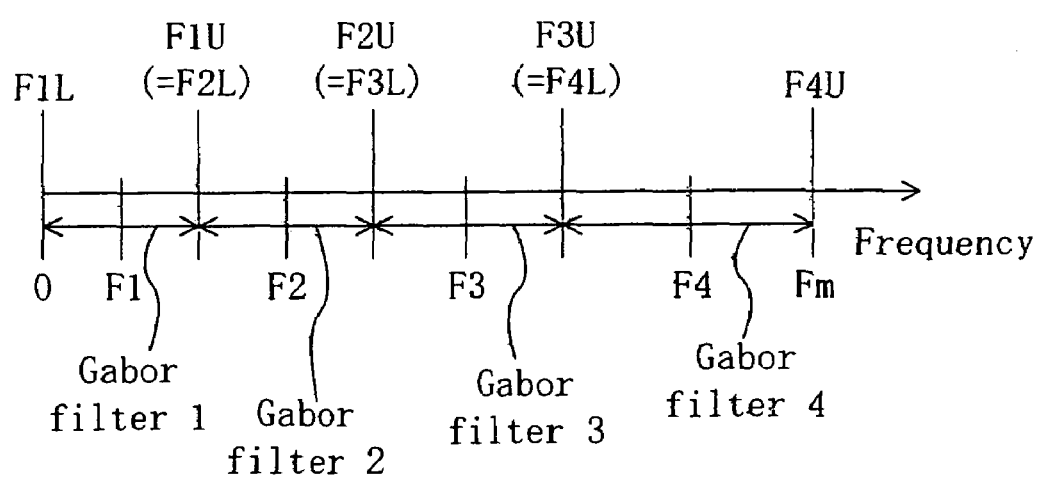
FIG. 9 is a view illustrating frequency analysis using four Gabor filters.

FIG. 9 illustrates analysis using four frequencies. In FIG. 9, the x-axis represents the frequency, showing how the frequency band from frequency 0 (DC component) to the upper-limit frequency Fm is analyzed with four Gabor filters having different passbands. F1 to F4 denote the center frequencies of the passbands of the four Gabor filters. When expressed in terms of the angular frequencies described above, the following are established.

$$\omega 1 = 2\pi F1, \omega 2 = 2\pi F2, \omega 3 = 2\pi F3, \omega 4 = 2\pi F4$$

Note that the upper-limit frequency Fm and the upper limit F4U of the passband of the Gabor filter are not necessarily identical to each other as shown in FIG. 9, but may establish the relationship F4U≦Fm.

Figure 10:
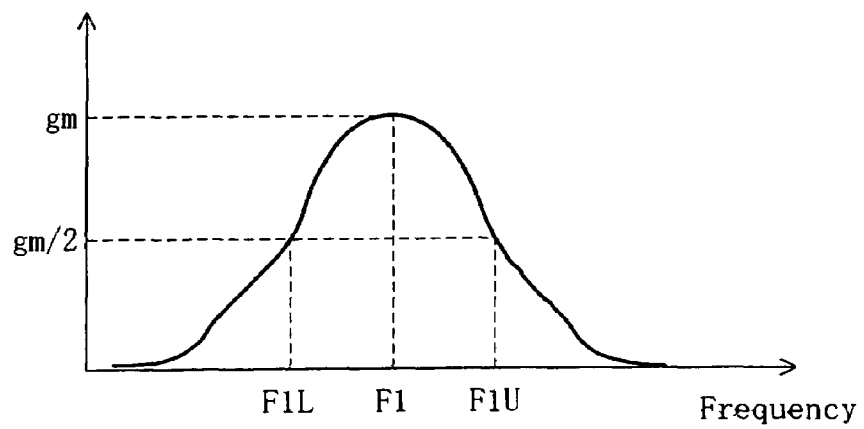
FIG. 10 represents Gaussian function used for the Gabor filter.

In FIG. 9, the passband of each Gabor filter is defined as between points at which the peak value of the Gaussian function used in the Gabor filter is halved, as shown in FIG. 10. To state differently, if the fringes of the Gaussian function (portions apart from the center) are taken into consideration, the passbands of the Gabor filters overlap each other. The points at which the passbands of the Gabor filters meet may be set at points other than those at which the Gaussian function is halved, such as points of σ, 2σ or 3σ where σ is the standard deviation of the Gaussian function.

A feature is then extracted from a Gabor-filtered signal as disclosed in the above publication. That is, the signal is changed to a binary value determined by whether the output of the Gabor filter is positive or negative and coded, as represented by the following expressions.

$$MSB_{Re}(r,\theta) = 1 \text{ if } Re \int_\rho \int_\phi e^{2\pi j \omega (\theta - \phi)} e^{-(r-\rho)^2/\alpha^2} e^{-(\theta-\phi)/\beta^2} I(\rho,\phi) \rho d\rho d\phi > 0$$

$$MSB_{Re}(r,\theta) = 0 \text{ if } Re \int_\rho \int_\phi e^{2\pi j \omega (\theta - \phi)} e^{-(r-\rho)^2/\alpha^2} e^{-(\theta-\phi)/\beta^2} I(\rho,\phi) \rho d\rho d\phi \leq 0$$

$$MSB_{Im}(r,\theta) = 1 \text{ if } Im \int_\rho \int_\phi e^{2\pi j \omega (\theta - \phi)} e^{-(r-\rho)^2/\alpha^2} e^{-(\theta-\phi)/\beta^2} I(\rho,\phi) \rho d\rho d\phi > 0$$

$$MSB_{Im}(r,\theta) = 0 \text{ if } Im \int_\rho \int_\phi e^{2\pi j \omega (\theta - \phi)} e^{-(r-\rho)^2/\alpha^2} e^{-(\theta-\phi)/\beta^2} I(\rho,\phi) \rho d\rho d\phi \leq 0 \quad (2)$$

where $I(\rho, \phi)$ is an input iris image represented by the polar coordinate system.

Figure 11A:
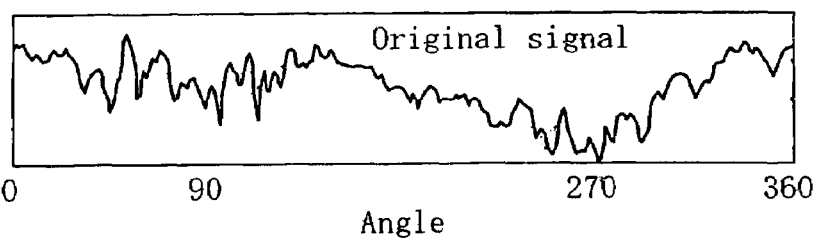
FIGS. 11A, 11B and 11C illustrate an example of an iris code.
Figure 11B:
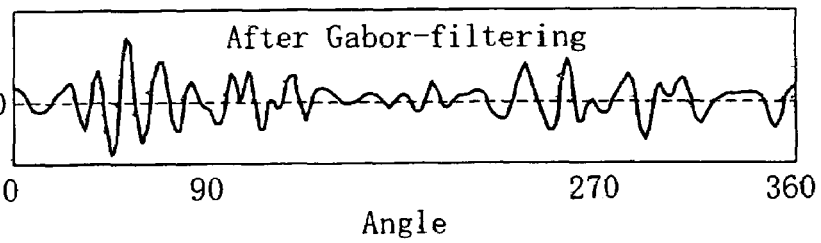
Figure 11C:
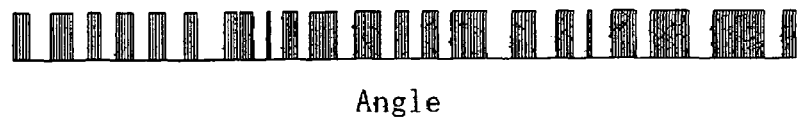

FIGS. 11A to 11C illustrate an example of extraction of an iris code. An iris image is actually a two-dimensional signal (in the radial direction and the angular direction (circumferential direction) on the polar coordinate system). However, in these figures, the iris image is shown one-dimensionally in the angular direction for simplification of description. FIG. 11A illustrates an original signal representing the brightness along the circumference of a circle having a certain radius of the iris image, FIG. 11B illustrates a signal obtained by Gabor-filtering the original signal of FIG. 11A, and FIG. 11C illustrates a signal obtained by changing the signal of FIG. 11B to a binary value, that is, an iris code. The iris code shown in FIG. 11C is generated for each frequency every ring region obtained by the division in step SA05.

Figure 12:
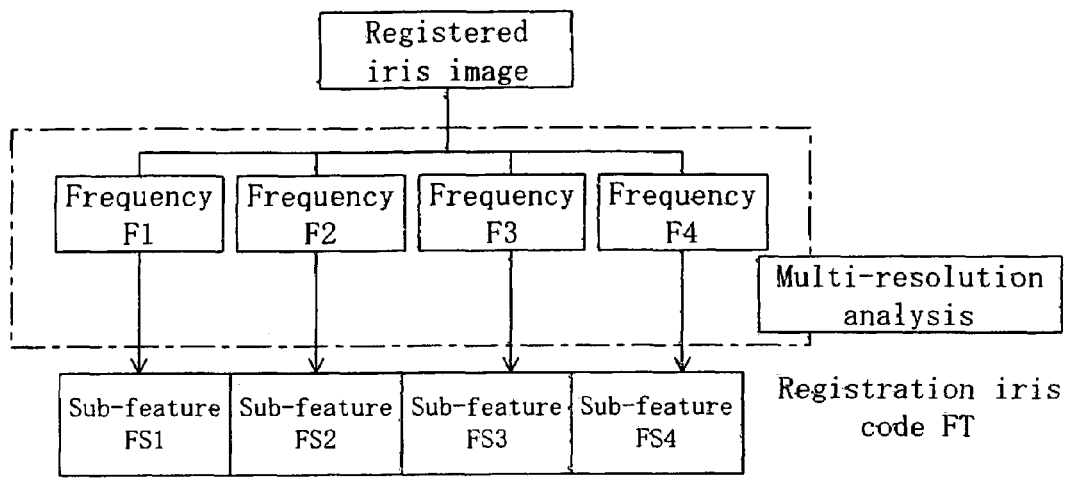
FIG. 12 is an illustration of generation of a registration iris code.

As shown in FIG. 12, sub-features Fsi obtained from analysis at respective frequencies Fi are put together to obtain a registration iris code FT. In step SA07, the registration iris code FT and analysis frequency information are stored in the iris DB 12 in association with the ID of the person concerned.

In this embodiment, the polar coordinate system was adopted for the iris image. Alternatively, a normal coordinate system may be adopted. Multi-resolution frequency analysis using Gabor filters, a type of multi-scale self-similarity type two-dimensional band-pass filters, was performed. Alternatively, another method utilizing multi-resolution analysis, such as wavelet analysis, may be employed.

In this embodiment, the feature was calculated using the real part and imaginary part of the Gabor filter separately. Alternatively, the power obtained by calculating the square root of sum of squares of the two parts may be used as the feature. The output of the Gabor filter may not be changed to a binary value, but the multilevel output may be used as it is as the feature.

<Authentication>

During authentication, the following processing is performed.

First, in step SB01 for image capture in the flowchart of FIG. 6, the user intending to receive authentication, that is, the person to be authenticated inputs an iris image using the cellular phone 21 shown in FIGS. 3 and 4, for example. In more detail, the user examines an image currently captured by a camera 22 (an image capture element incorporated in the camera 22) displayed on a monitor 23, and presses a button 25 for execution of image capture when it is confirmed that his or her own iris image on the monitor 23 is in sharp focus. Upon the pressing of the button, an illuminator 24 is lit, and an image is taken in synchronization with the lighting timing. The iris image taken is stored in a frame memory 32 of the cellular phone 21. Thereafter, an iris feature extraction program stored in a program memory 34 is read therefrom into a work memory 33 for execution of step SB02 and the subsequent steps in FIG. 6.

Although the camera-equipped cellular phone was used in the above description, any other apparatus may be used as long as it is equipped with a camera. For example, a camera-equipped PHS (personal handy phone), a camera-equipped PDA, a camera-equipped interphone, a digital camera having communication function, and the like may be used.

In this embodiment, feature extraction is performed by software using an iris feature extraction program. Alternatively, iris feature extraction processing may be implemented by a dedicated circuit or a digital signal processor (DSP) to perform the feature extraction by hardware.

Steps SB02 and SB03 in which the iris region is defined from the iris image taken, step SB04 in which the coordinate system is determined, and step SB05 in which the iris region is divided into analysis regions are the same as steps SA02 to SA05 during the registration, respectively. Description of these steps is therefore omitted here.

In step SB06, the resolution of the iris image is calculated. Herein, a resolution R is defined as the circumferential length at the iris/pupil boundary or the iris inner boundary calculated in step SB02. The resolution R may be the number of pixels on the iris inner boundary, or may be determined as $R=2\pi r0$ from the radius r0 calculated in step SB02.

In step SB07, the frequency band for analysis (analysis frequency band) is determined from the resolution R of the iris image. The resolution R is identical to the sampling frequency $Fsp=R$ (Hz) in the circumferential direction at the iris/pupil boundary. When R points are sampled for one period (360 degrees), the sampling period (sampling interval) is 360/R degrees. Therefore, since sampling is made around 360 degrees at sampling intervals of 360/R degrees, the sampling frequency $Fsp=360/(360/R)=R$ (Hz).

Thus, according to the sampling theorem, the upper limit Fmp of the frequency effective for analysis of the iris image is determined as $$Fmp=Fsp/2=R/2$$

The upper limit Fmp itself is not an effective analysis frequency. To be precise, therefore, a frequency lower than the upper limit Fmp may be used for the analysis.

That is, according to the sampling theorem, even if the analysis is made at a frequency equal to or higher than Fsp/2, a portion of the feature corresponding to such a frequency is useless as a feature. If such a portion is included in the entire feature for comparison, the entire degree of coincidence degrades.

The reason why the sampling frequency is determined with respect to the circumference at the iris/pupil boundary is that the pattern (of folds) extending radially from the innermost radius of the iris linear the iris/pupil boundary) works as an effective feature for personal authentication, and that the polar coordinates are applied to the iris separated and the Gabor filters are used for detecting a change in shading in the circumferential direction on the polar coordinate system.

When a normal coordinate system is applied to the iris image for the analysis in place of the polar coordinate system, the resolution may be determined from an amount that varies with the size of the iris sampled, such as the radius or diameter of the iris image, the area (number of dots) of the iris region separated, and the area (number of dots) of the pupil, for determination of the analysis frequency band.

In some terminals used for authentication, the resolution and the lens system of the image capture device incorporated therein are known, and when the image capture distance is roughly constant (the depth of field is small), the size of the iris taken is roughly the same. In this case, therefore, the analysis frequency band may be determined in advance for each terminal using a method as described above. In this case, a reference table associating the terminal with the analysis frequency band may be prepared, to enable determination of the analysis frequency band from the type of the terminal.

There is another case that the image capture distance can be measured with a distance-measuring sensor and camera information such as the lens system (zooming available) and the resolution of the image capture device can be obtained. In this case, the size of the iris taken is roughly predictable. Therefore, a reference table associating the image capture distance and the camera information with the analysis frequency band may be prepared, to enable determination of the analysis frequency band from the image capture distance and the camera information.

Assume that during the registration, frequency analysis was performed for four frequency bands having center frequencies F1 to F4 with the frequency F4U as the upper limit, to calculate a feature.

In the above case, when the upper limit Fmp of the frequency for the iris image during the authentication is larger than the upper-limit frequency F4U during the registration, frequency analysis is performed for the four frequency bands as was done during the registration. When Fmp<F4U, the maximum n satisfying Fmp≦FnU is calculated. If n=3, frequency analysis for three frequency bands having center frequencies F1 to F3 is performed.

In step SB08, a feature is extracted using the Gabor filters represented by expression (1) above. This step is substantially the same as step SA06 during the registration, except that the frequency analysis is performed for the frequency bands determined in step SB07. When n=3 in step SB07, that is, when it has been determined in step SB07 that analysis for three frequency bands having center frequencies F1 to F3 should be performed, three Gabor filters ($\omega 1=2\pi F1$, $\omega 2=2\pi F2$, $\omega 3=2\pi F3$) corresponding to these frequency bands are used. Extraction of a feature from a Gabor-filtered signal is performed using expressions (2) as in step SA06.

Figure 13:
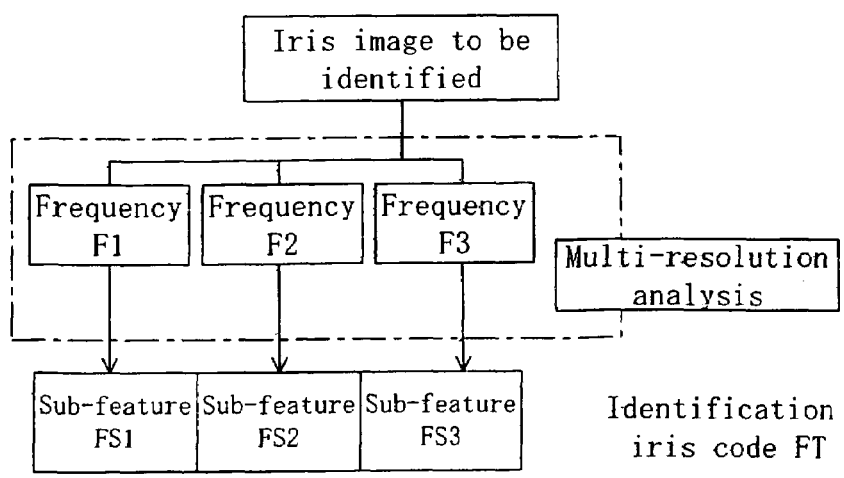
FIG. 13 is an illustration of generation of an identification iris code.

In step SB09, as shown in FIG. 13, sub-features Fsi (binary codes) corresponding to frequencies Fi, extracted in step SB08, are put together to obtain an identification iris code FT.

Once the above processing is completed in the iris authentication terminal 15, the generated feature and analysis frequency information are sent to the iris authentication server 11 via the network 13.

In this embodiment, the iris authentication terminal 15 executes the steps until step SB09 for feature extraction, and then sends the feature to the iris authentication server 11 via the network 13, so that authentication is made by the iris authentication server 11. Alternatively, the iris authentication terminal 15 may execute only step SB01 for iris image capture and send the iris image to the iris authentication server 11 via the network 13, so that the iris authentication server 11 can execute steps SB02 to SB09 for feature extraction, as well as steps SB10 and SB11 for identification.

Alternatively, the iris authentication terminal 15 may execute the series of processing including steps SB01 for iris image capture, steps SB02 to SB09 for feature extraction, and steps SB10 and SB11 for identification. In this case, the registration iris codes used for comparison are sent to the iris authentication terminal 15 via the network 13 for comparison at the terminal 15.

There are one to N authentication and one to one authentication. In one to N authentication, the person to be authenticated does not inform the system of his or her own ID. Therefore, the feature extracted during the authentication is compared with all reference features in the iris DB 12. The person is authenticated when the similarity to (distance from) the most similar reference feature is equal to or more than (less than) a predetermined threshold. In one to one authentication, the person to be authenticated informs the system of his or her own ID. The feature extracted during the authentication is compared with the reference feature corresponding to the ID given by the person. The person is authenticated when the similarity (distance) therebetween is equal to or more than (less than) a predetermined threshold. Thus, in one to N authentication, when the comparison is performed at the iris authentication terminal 15, all the features stored in the iris DB 12 are sent to the terminal 15 via the network 13.

In this embodiment, in the iris authentication server 11, the iris code for authentication is compared with the reference iris codes stored in the iris DB 12 for personal authentication. The present invention is applicable to both one to N authentication and one to one authentication described above. Since they are only different in whether the feature is compared with a plurality of features or a single feature, the type of authentication is not specifically mentioned in the following description.

Figure 14:
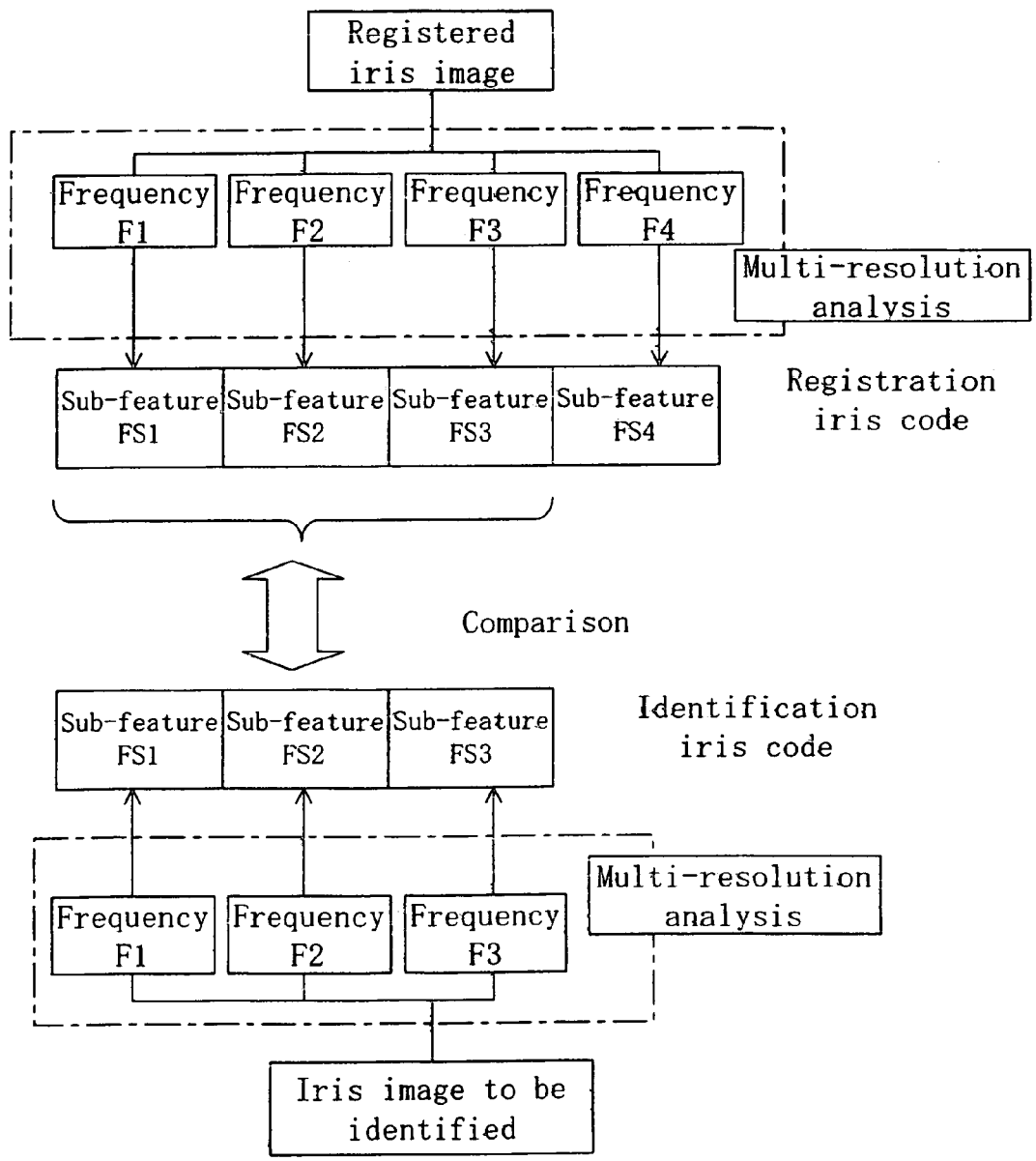
FIG. 14 is an illustration of comparison between the registration iris code and the identification iris code.

In step SB10, the identification iris code generated in step SB09 during the authentication is compared with a registration reference iris code stored in step SA07 during the registration. In the comparison, as shown in FIG. 14, analysis frequency information attached to both the identification and registration iris codes is referred to so that sub-features analyzed at the same frequency are compared with each other. In the illustrated example, where analysis was performed for four frequency bands having center frequencies F1 to F4 during the registration while it was performed for three frequency bands having center frequencies F1 to F3 during the authentication, sub-features FS1 analyzed at the frequency F1, sub-features FS2 analyzed at the frequency F2, and sub-features FS3 analyzed at the frequency F3 are respectively compared with each other.

Figure 15:
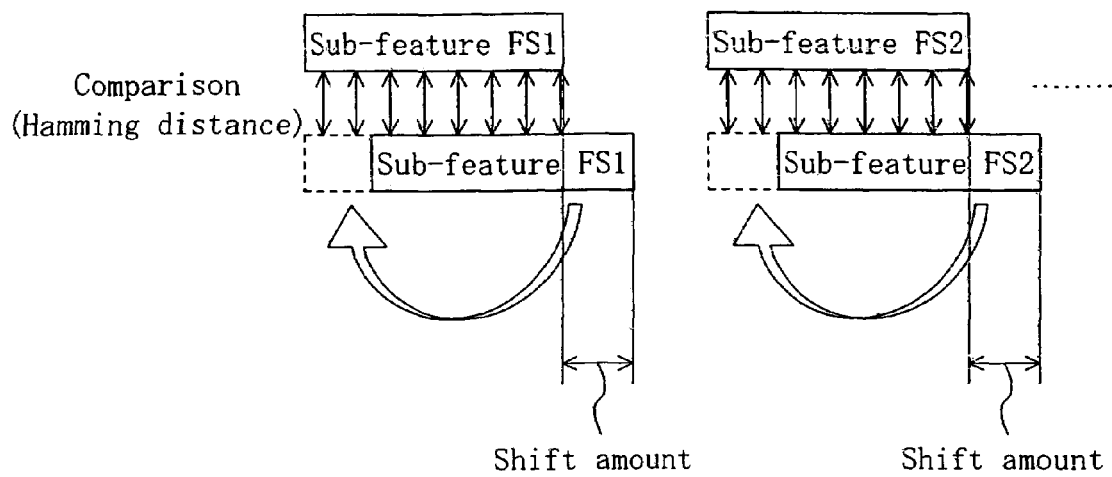
FIG. 15 is an illustration of calculation of a hamming distance.

For comparison, the hamming distance is used. In addition, as shown in FIG. 15, in calculation of the hamming distance, the features are shifted by a same amount to compensate tilting of the face and rotational movement of the eyeball itself. The minimum hamming distance obtained when the shift amount is varied within a predetermined range (range within which rotation of the iris pattern is allowed) is determined as the final hamming distance.

In step SB11, the hamming distance obtained by comparing respective bits of the features is divided by the number of comparison (total number of bits) and normalized, to obtain an authentication distance (authentication score). When the authentication distance is equal to or less than a predetermine threshold, the identity of the person is authenticated. When it exceeds the predetermined threshold, the person is rejected as being a stranger.

In this embodiment, the hamming distance (exclusive OR (XOR)) was used because the generated iris code is a binary value. If the feature is a multilevel value, another distance measure (such as Euclid distance and normalized correlation) may be used.

Thus, in this embodiment, personal authentication is possible without degrading the authentication precision even when the iris image is taken with an image capture device providing a resolution lower than that obtained during the registration.

Embodiment 2

When the image capture device used during the authentication is low in resolution, no sub-feature for a high-resolution portion in multi-resolution analysis (no feature from analysis at a frequency equal to or more than the upper-limit frequency $Fmp=Fsp/2$) is extracted and thus used for comparison. This reduces the total number of bits (information amount) of features used for comparison. Due to the decrease in information amount, the separability of a comparison score distribution for an identical person from that for different persons may be low, and this may degrade comparison precision.

Figure 16:
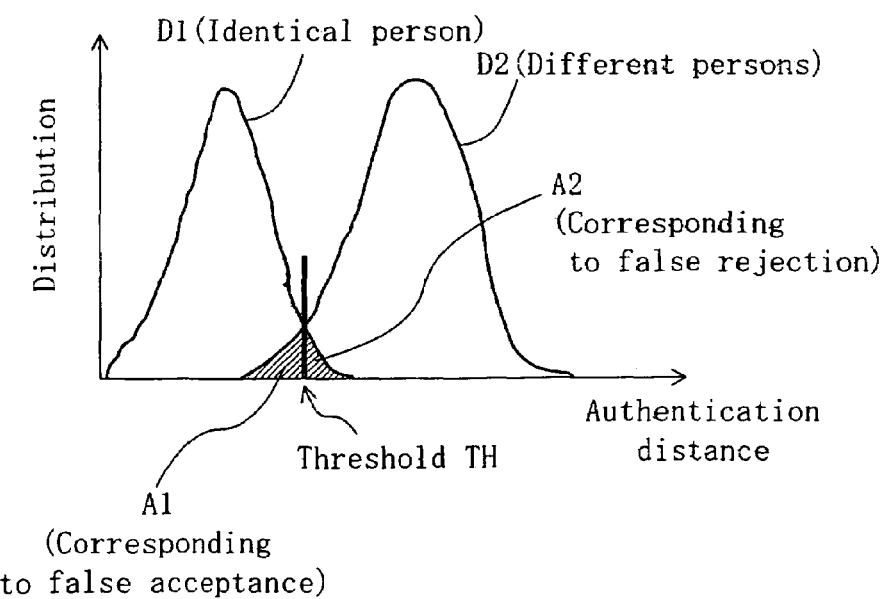
FIG. 16 is a conceptual illustration of distributions of authentication distances between identical persons and between different persons.

FIG. 16 conceptually shows a distribution D1 of authentication distances between identical persons and a distribution D2 of authentication distances between different persons, obtained by comparing features in combinations of arbitrary persons. In FIG. 16, when a threshold TH for distinguishing the identical person from other persons is set as illustrated, the part of the distribution D2 for different persons smaller in authentication distance than the threshold TH (hatched part A1) corresponds to a "false accept" part in which a different person is mistakenly accepted. Therefore, from a distribution as that shown in FIG. 16, the false acceptance rate (FAR), the rate at which different persons are mistakenly accepted, can be trial-calculated to some extent.

In this embodiment, therefore, FAR is trial-calculated in advance for each combination of sub-features Fsi by referring to the iris DB 12. In addition, a reference FAR value, which should be guaranteed, is determined. Thus, in the event that the reference FAR fails to be satisfied when the feature FT is obtained with a low-resolution image capture device without including a sub-feature analyzed at a high frequency (without analysis at a high frequency) during the authentication as shown in Embodiment 1, it is possible to take measures such as inhibiting proceeding to the authentication step.

A false rejection rate (FRR) is another indicator of authentication precision. When the image capture device used during the authentication is low in resolution, the feature of a high-resolution portion obtained during multi-resolution analysis is not used. Therefore, since the information amount of the feature used for comparison is small, the distribution D1 for an identical person itself may expand, causing debasement in FRR. In FIG. 16, the part of the distribution D1 for an identical person greater in authentication distance than the threshold TH (hatched part A2) corresponds to the "false rejection" part.

Figure 17:
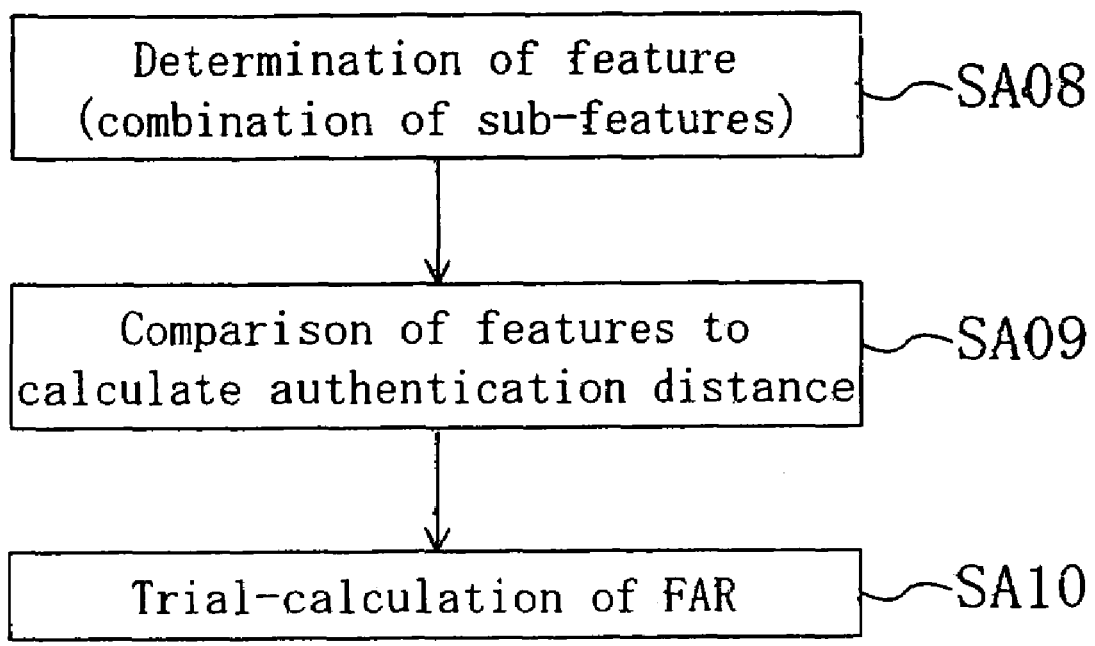
FIG. 17 is a flowchart of processing in a personal authentication method in Embodiment 2 of the present invention.

FIG. 17 is a flowchart of processing in a personal authentication method of Embodiment 2 of the present invention. The processing shown in FIG. 17 is executed after the storing of the feature in the iris DB 12 (see FIG. 5).

As in Embodiment 1, an iris image is analyzed with 2D Gabor filters having a plurality of frequency passbands, to prepare sub-features FSi corresponding to respective frequencies Fi. In this embodiment, assume that four frequency bands are used for analysis as shown in FIG. 12 to obtain four sub-features FSi. This operation is repeated by the number of persons entered in the iris DB 12. Assume herein that the number of persons entered in the iris DB 12 is N, at least one iris image is taken for each person, and a feature is extracted from each iris image.

In step SA08, the reference FAR (=T) and a feature (combination of sub-features) used for trial-calculation of FAR are determined. First, suppose all the sub-features FS1 to FS4 are selected. That is, all the sub-features FS1 to FS4 are put together to generate the feature FT. In step. SA09, for the feature FT, calculated are the authentication distance between features extracted from a person P and the authentication distances between a feature extracted from the person P and features extracted from all of the persons other than P. The resultant distributions are shown in FIG. 18A.

Figure 18A:
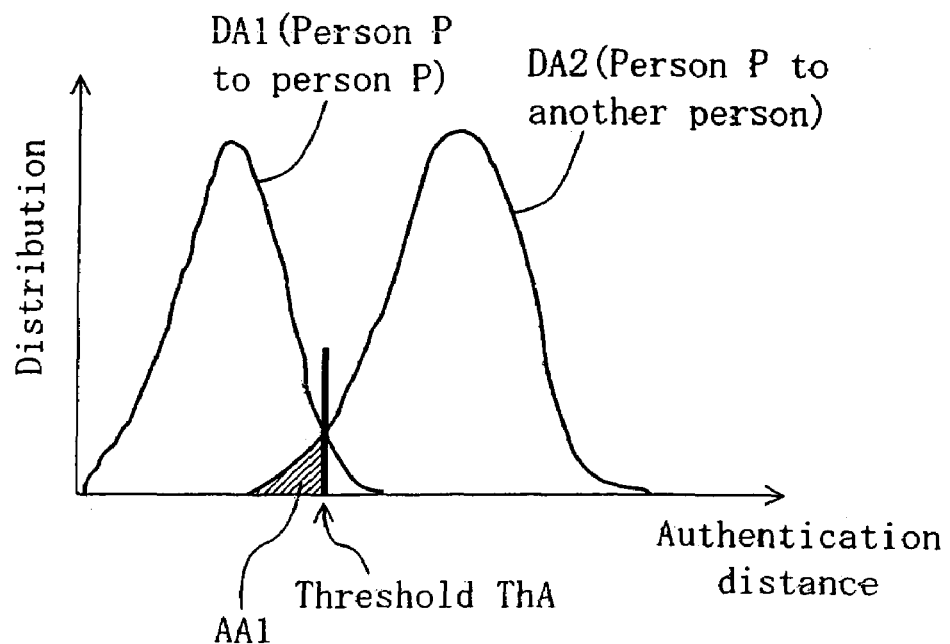
FIGS. 18A and 18B are conceptual illustrations of distributions of authentication distances between identical persons and between different persons.

When there are a plurality of registered features for the person P, an authentication distance distribution DA1 can be prepared as shown in FIG. 18A by comparing features of the identical person P with one another. An authentication distance distribution DA2 can also be prepared by comparing the person P with the other persons. A threshold ThA is determined from the distributions DA1 and DA2. Herein, the threshold ThA is set so that FAR and FRR are equal to each other.

The threshold ThA is set for each combination of the person P and the feature, and the setting may be done in various ways depending on the purpose of the authentication. For example, if it is desired to reject others without fail, the threshold ThA may be set lower trading off a more or less increase in false rejection rate (FRR). If rejection of the identification of the person P will cause much difficulty from the standpoint of user interface, the threshold ThA may be set higher trading off the false acceptance rate (FAR). If only one registered feature is available for the person P, no distribution for the identical person is generated. The threshold Th is therefore determined referring to only FAR.

If the registered data amount in the iris DB 12 is not sufficiently large, the two distributions may not overlap each other, unlike those shown in FIG. 18A. In this case, the two distributions may be approximated with an appropriate function to form an overlap portion thereof.

In step SA10, the FAR is trial-calculated using the threshold ThA. In the case shown in FIG. 18A, the FAR corresponds to a hatched part AA1. Whether or not the part AA1 is smaller than a predetermined reference FAR=T is determined. If AA1<T, it is judged that analysis at frequencies F1 to F4 is possible for identification of the person P.

Likewise, the FAR in the combination of sub-features FS1 to FS4 is trial-calculated for all the persons, and whether or not the trial-calculated FAR is lower than a predetermined threshold T is judged. The reason why the FAR is trial-calculated for each person is as follows. Some persons can be adequately distinguished from others only with a feature analyzed at a low frequency while other persons cannot. Therefore, combinations of sub-features suitable for respective persons can be obtained by trial-calculation for each person.

Persons distinguishable from others only with a feature analyzed at a low frequency are those unique in the low-frequency portion of the iris pattern. Naturally, unlike the method of this embodiment, the authentication precision may be trial-calculated for an identical person and for different persons to be used for all the persons in common. In this case, the entire distribution of authentication distances between identical persons and the entire distribution of authentication distances between different persons are compared with each other, to trial-calculate FAR. This eliminates the necessity of holding effective combinations of sub-features for respective persons in the iris DB 12, and thus the effect that the memory capacity can be reduced is attained.

Subsequently, steps SA08 to SA10 are repeated for another combination of sub-features. For example, suppose the sub-features FS1 to FS3 were selected as the second combination, and as a result of similar processing, authentication with adequate precision was successfully done for all the persons.

Figure 18B:
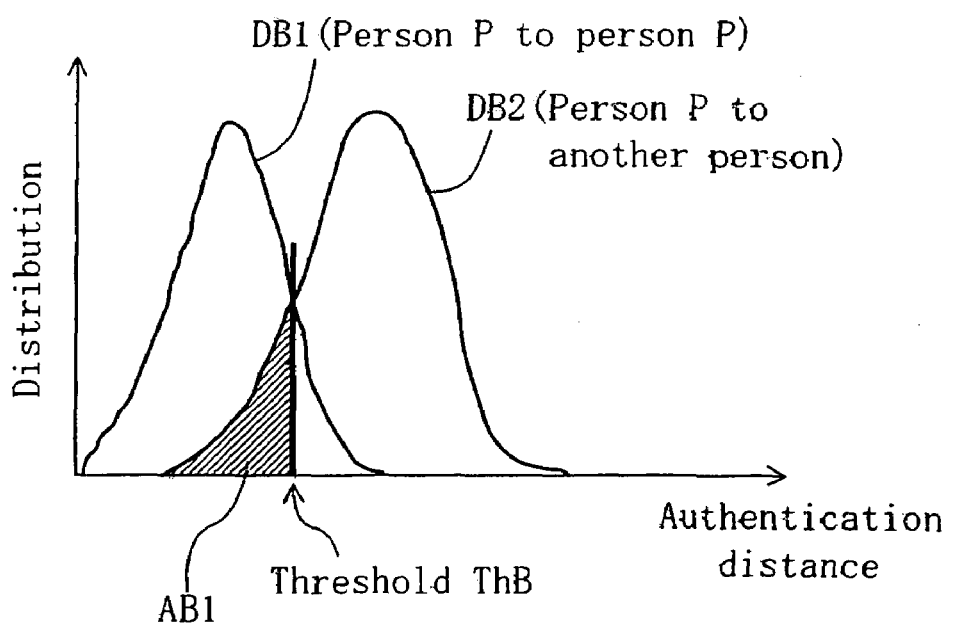

Thereafter, suppose the sub-features FS1 and FS2 are selected as the third combination. FIG. 18B shows a distribution DB1 of authentication distances between the identical persons P and a distribution DB2 of authentication distances between the person P and all of the persons other than the person P obtained in this case. The FAR corresponds to the area of a hatched part AB1. When AB1≧T, adequate authentication precision is not obtainable in analysis at frequencies F1 and F2 for identification of the person P. Thus, it is found from the calculation using the iris DB 12 that adequate authentication precision will not be obtained for authentication of the person P unless at least the frequencies F1 to F3 are used for analysis.

Therefore, in this embodiment, if the person P attempts to be authenticated using an iris image with a resolution with which the highest frequency used for analysis will be lower than F3, the person P can be warned or notified of inability of authentication by the iris authentication server 11.

In this embodiment, the FAR was used as an indicator of authentication precision, which however varies with the setting of the threshold Th. As an alternative indicator of authentication precision independent of the threshold Th, therefore, the sum of FAR and FRR, for example, may be used. In this case, the authentication precision is independent of the threshold Th, and determined only by two distributions as shown in FIG. 16.

In this embodiment, the distribution for the identical person is used for each person. Actually, however, since the number of registered features of one person is limited (one to several pieces), the distribution as described above may not be obtained in some cases. In these cases, an iris moving picture may be taken for several seconds during the registration of the iris image, and frame images of the moving picture may be extracted to be used as registered images. For example, when a moving picture of an iris is taken for three seconds with a 30 frames/sec progressive scanning camera, a total of 90 iris images are obtained. After defective images such as that taken when the person blinks are removed, the remaining images can be used as images for registration. If a moving picture is taken with an illuminator of varying lightness, images with various pupil sizes can be obtained. In this case, it is possible to obtain a distribution for the identical person using images taken under various conditions.

The distribution for the identical person can be updated by adding duly-authenticated features to the database every time the person is authenticated.

Steps SA08 to SA10 are processing performed in advance during the registration, not during the comparison. In the event that data is newly entered in the iris DB 12 or a registered feature for a certain person is updated, this processing may be executed again. If execution of the processing every time of registration is undesirable, the processing may be executed periodically such as once a week or a month.

The combinations of analysis frequencies are not limited to those of frequencies in series such as frequencies F1 to Fk, but may be combinations of discrete frequencies such as frequencies F1, F3 and F5. The latter combinations are effective in such cases that use of frequencies F1, F3 and F5 increases uniqueness (distinction from others) but additional use of frequencies F2 and F4 rather decreases distinction from distributions for different persons.

In this embodiment, whether or not a person should be finally authenticated is judged depending on the estimated authentication precision. The authentication precision can also be used to control the power bestowed on the person authenticated after the authentication. For example, in personal authentication for electronic commerce, the ceiling of the amount of money allowed for transaction may be set depending on the estimated authentication precision. In personal authentication for entrance/exit control, the room a person is allowed to enter may be determined depending on the estimated authentication precision for the person. In personal authentication for logging in to a PC or the like, executable commands (browsing only, rewritable, erasable) and the like may be controlled depending on the estimated authentication precision.

Whether or not re-authentication is allowed may be determined depending on the estimated authentication precision. For example, if the camera of the iris authentication terminal 15 is zooming-adjustable, instruction may be made to take an image again with a larger zoom value. If the camera is focusing-adjustable, instruction may be made to take an image again with the iris being closer to the camera.

In Embodiment 1, the selection of frequencies during the authentication was made based on the resolution of the iris image taken during the authentication. In place of or in addition to the resolution, the selection of frequencies during the authentication may be made based on the authentication precision for each combination of frequencies. For example, among combinations of frequencies providing a FAR equal to or less than a predetermined value, a combination providing the smallest FAR or a combination composed of the smallest number of frequencies may be used during the authentication.

In this embodiment, the threshold of the authentication distance was determined in advance, and the FAR was trial-calculated using the threshold. In reverse, the threshold can be calculated from the minimum guaranteed FAR. Therefore, if the FAR fails to reach the minimum guaranteed value, the threshold may be made tighter for next authentication.

The authentication precision can be estimated from the feature obtained during the registration as described above. Therefore, it is possible, for example, to take images of both right and left irises, trial-calculate authentication precision for these images, and register one of the iris images better in authentication precision (that is, more distinguishable from the features for others). Alternatively, if both iris images are low in authentication precision, both of them may be registered to be used for authentication.

Likewise, in the case of fingerprint authentication, for example, a plurality of fingers may be registered to finally select a fingerprint with high authentication precision. Otherwise, if a predetermined level of authentication precision is not obtainable with a single finger, a plurality of fingers may be registered to be used together during authentication.

Embodiment 3

In Embodiment 1, an iris image was taken with an image capture device providing a comparatively high resolution capable of taking an iris image with an adequate resolution during the registration. Thereafter, multi-resolution analysis was performed to extract a sub-feature for each analysis frequency band. During the authentication, at least one frequency band for analysis is determined from the iris image taken. Sub-features obtained for the same frequency band during the registration and during the authentication were compared with each other, to perform personal authentication.

In Embodiment 3 of the present invention, a plurality of iris images with different resolutions are acquired during the registration.

Such iris images with different resolutions may be acquired by actually taking a plurality of iris images with different resolutions. This can be done using a plurality of cameras of which image capture elements provide different resolutions, or by taking images a plurality of times with one camera while varying the zoom value of the camera.

Figure 19:
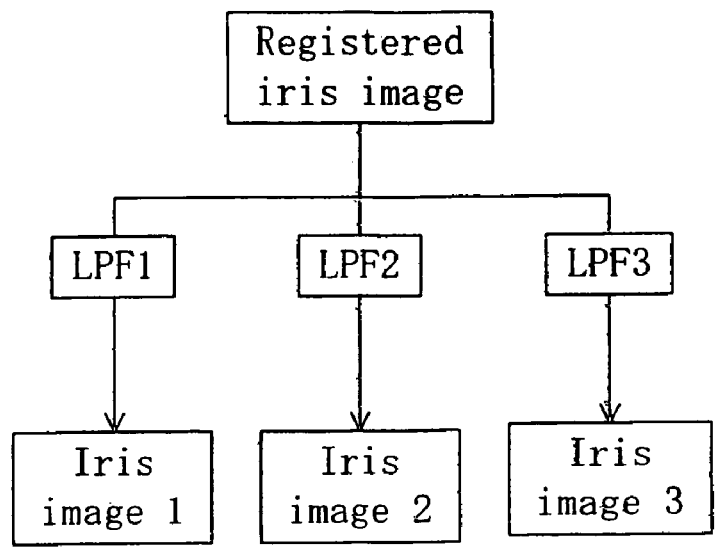
FIG. 19 is an illustration of a method for generating a plurality of iris images with different resolutions using low-pass filters.

As another acquiring method, an iris image may be taken at an adequate resolution, and, as shown in FIG. 19, the iris image taken may be subjected to a plurality of (three in FIG. 19) low-pass filters LPF1 to LPF3 to generate a plurality of iris images with different resolutions. In this case, the resultant iris images are the same in size, but different in frequency components contained in the images (high-frequency components are cut).

Thereafter, frequency bands to be used for analysis are determined for the acquired iris images with different resolutions in the following manner.

As for the iris images with different resolutions actually taken, the frequency bands are determined based on the number of pixels on the circumference at the boundary between the iris and the pupil, as was done during the authentication in Embodiment 1.

Figure 20:
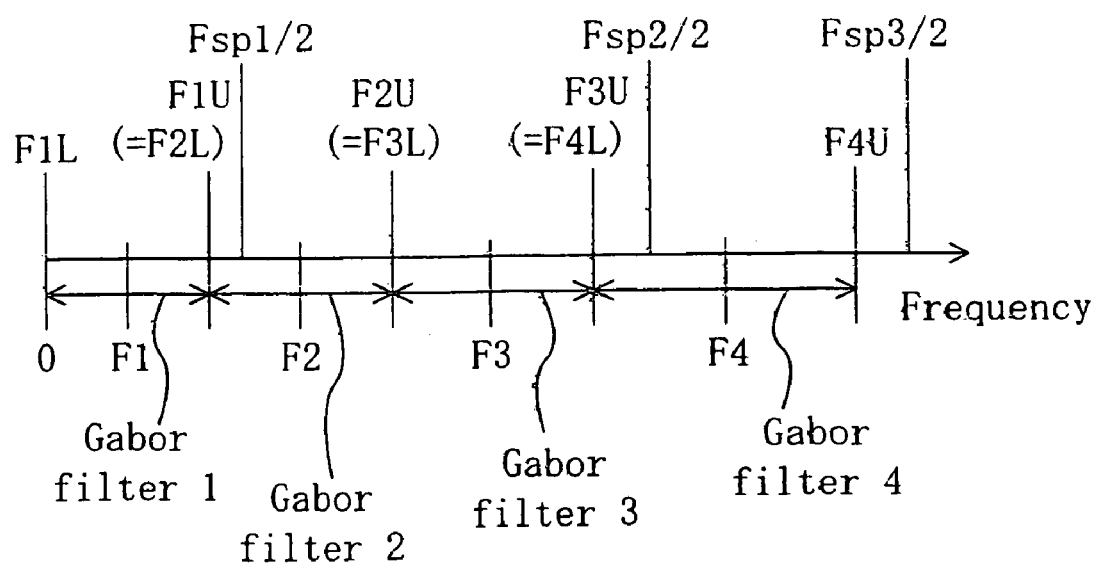
FIG. 20 is an illustration of selection of Gabor filters.
Figure 21A:
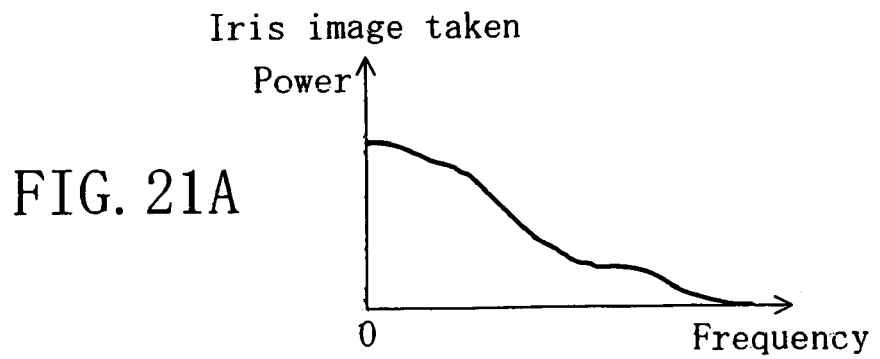
FIGS. 21A to 21D are views representing the images generated using low-pass filters in terms of the frequency range using Fourier transform.
Figure 21B:
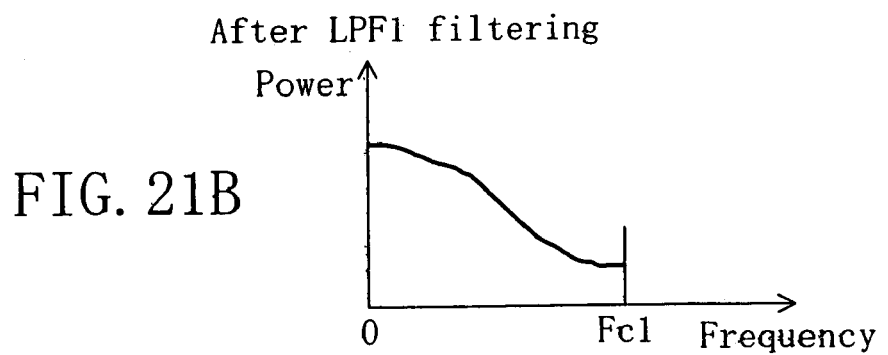
Figure 21C:
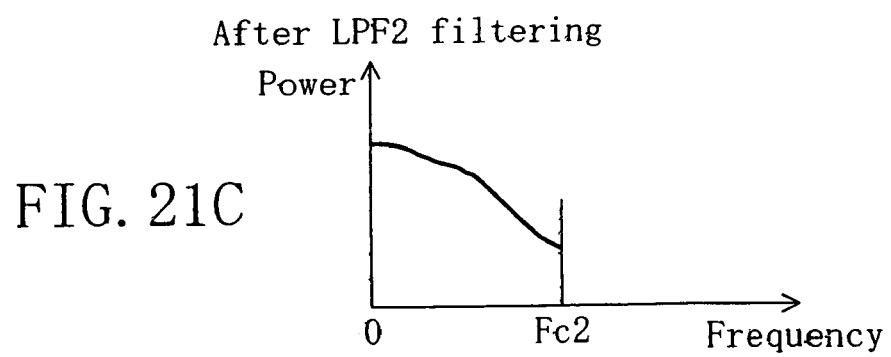
Figure 21D:
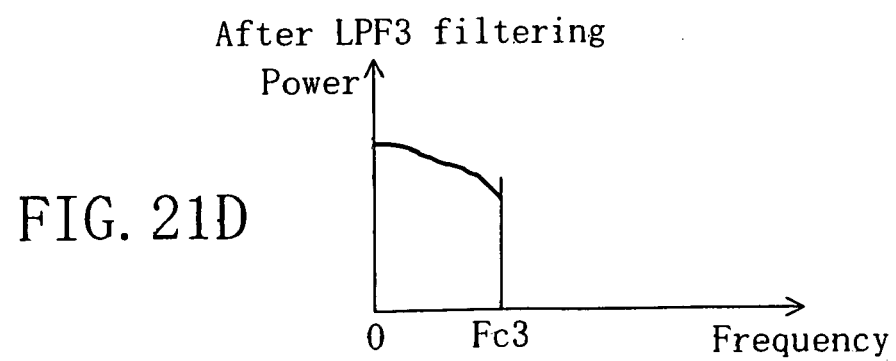

Suppose, for example, iris images are taken at three resolutions R1, R2 and R3, and respective upper-limit frequencies Fsp1, Fsp2 and Fsp3 for analysis are determined according to the sampling theorem. Also, n (n=1 to 4) Gabor filters each having a passband having a center frequency Fn (lower-limit frequency FnL and upper-limit frequency FnU) are prepared as shown in FIG. 20. The Gabor filters are selected so that the upper limit FnL of each passband does not exceed a half of the sampling frequency Fs for the iris image. As a result, the image with the resolution R1 is analyzed using only the labor filter 1, the image with the resolution R2 is analyzed using the Gabor filters 1 to 3, and the image with the resolution R3 is analyzed using the Gabor filters 1 to 4.

As in Embodiment 1, the passbands of the adjacent Gabor filters overlap each other at positions where the Gaussian function is halved.

As for the iris images acquired using a plurality of low-pass filters, the frequency bands are determined from the properties of the low-pass filters used.

FIGS. 21A to 21D are views of an iris image taken with a camera and iris images generated using a plurality of low-pass filters, represented in terms of the frequency range using Fourier transform. Note that although 2D Fourier transform is actually used because the images are two-dimensional, one-dimensional representations (dimension in the circumferential direction of the iris on polar coordinates) are shown in FIGS. 21A to 21D for simplification of description as in Embodiment 1.

Figure 22:
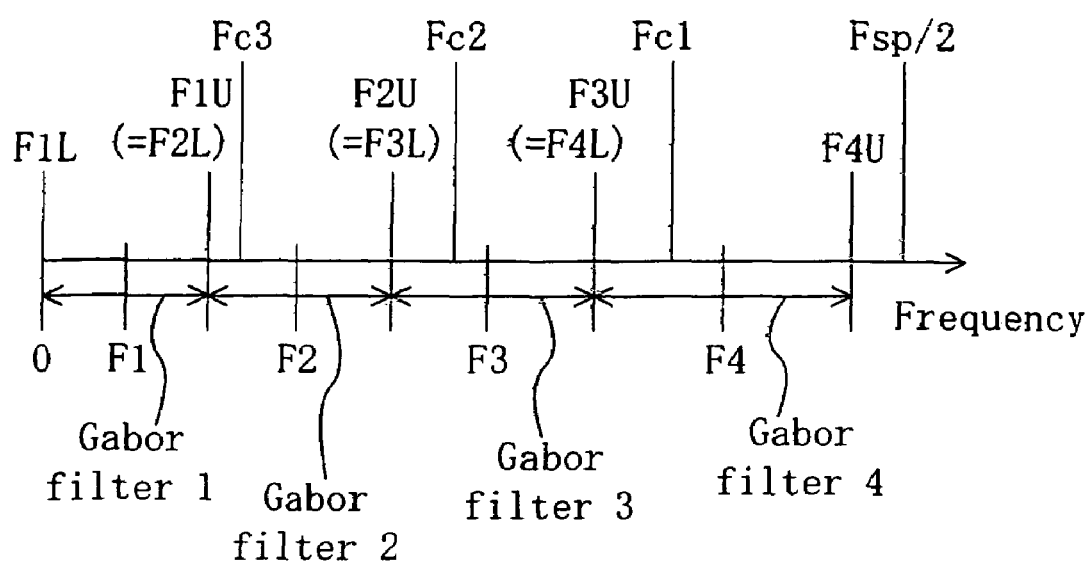
FIG. 22 is an illustration of selection of Gabor filters.

From FIGS. 21A to 21D, it is found that the low-pass filter LPFi (i=1 to 3) allows pass of frequencies equal to and lower than Fci. Herein, the following relationship is established:

$$Fsp/2 > Fc1 > Fc2 > Fc3$$

where Fsp is the sampling frequency of the original image. The frequency band for analysis can be determined uniquely from the properties of the low-pass filter used. This will be described more specifically referring to FIG. 22. Suppose the Gabor filters are selected so that the upper-limit frequency FnU of the passband of each Gabor filter does not exceed the blocking frequency Fci of the low-pass filter used for the image in question. Then, the image subjected to the low-pass filter LPF1 is analyzed using the Gabor filters 1 to 3, the image subjected to the low-pass filter LPF2 is analyzed using the Gabor filters 1 and 2, and the image subjected to the low-pass filter LPF3 is analyzed using only the Gabor filter 1. The original image is analyzed using the Gabor filters 1 to 4 as in Embodiment 1.

Figure 23:
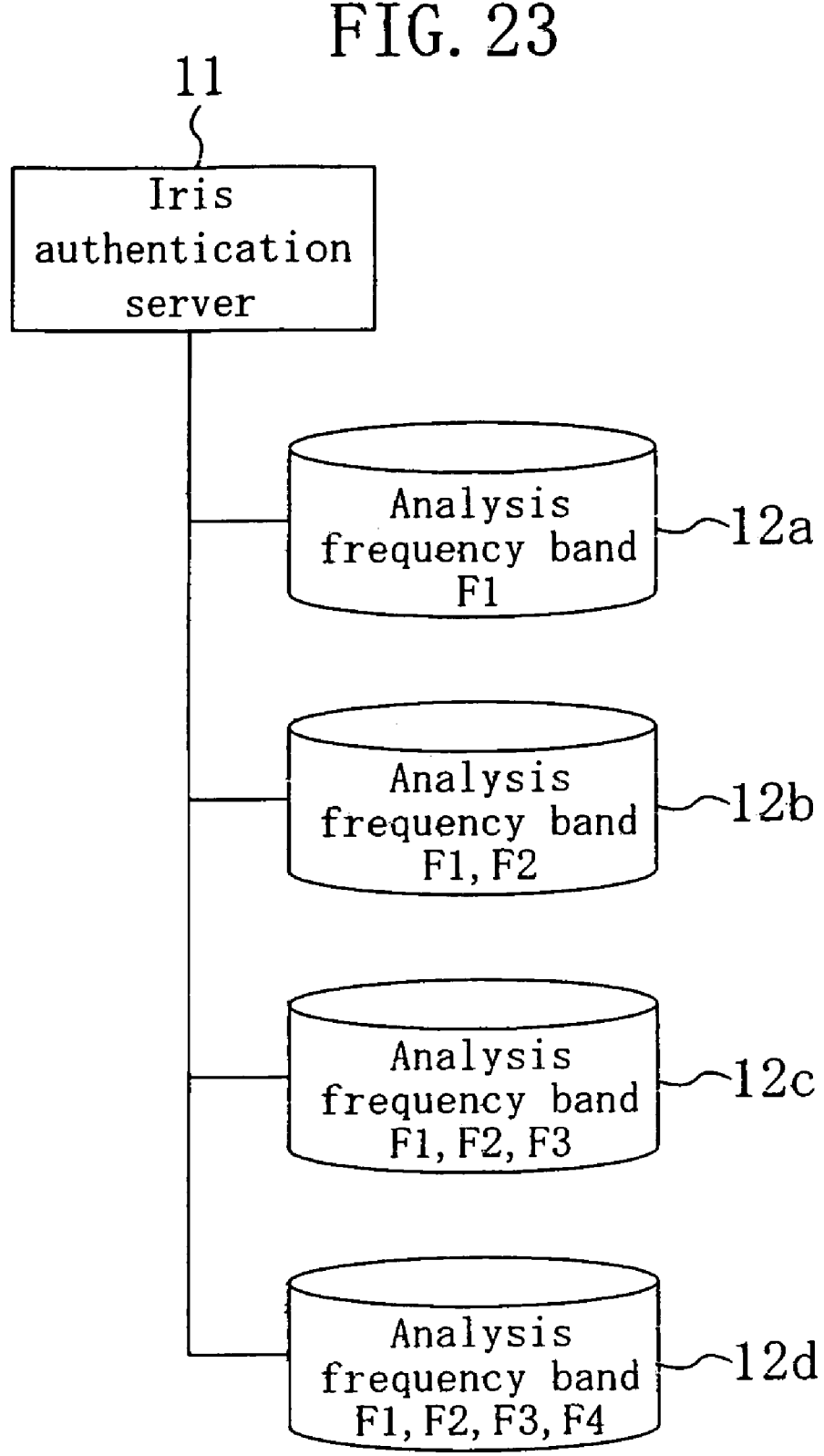
FIG. 23 is an illustration of iris DBs in which extracted features are stored separately by combination of analysis frequency bands.
Figure 24:
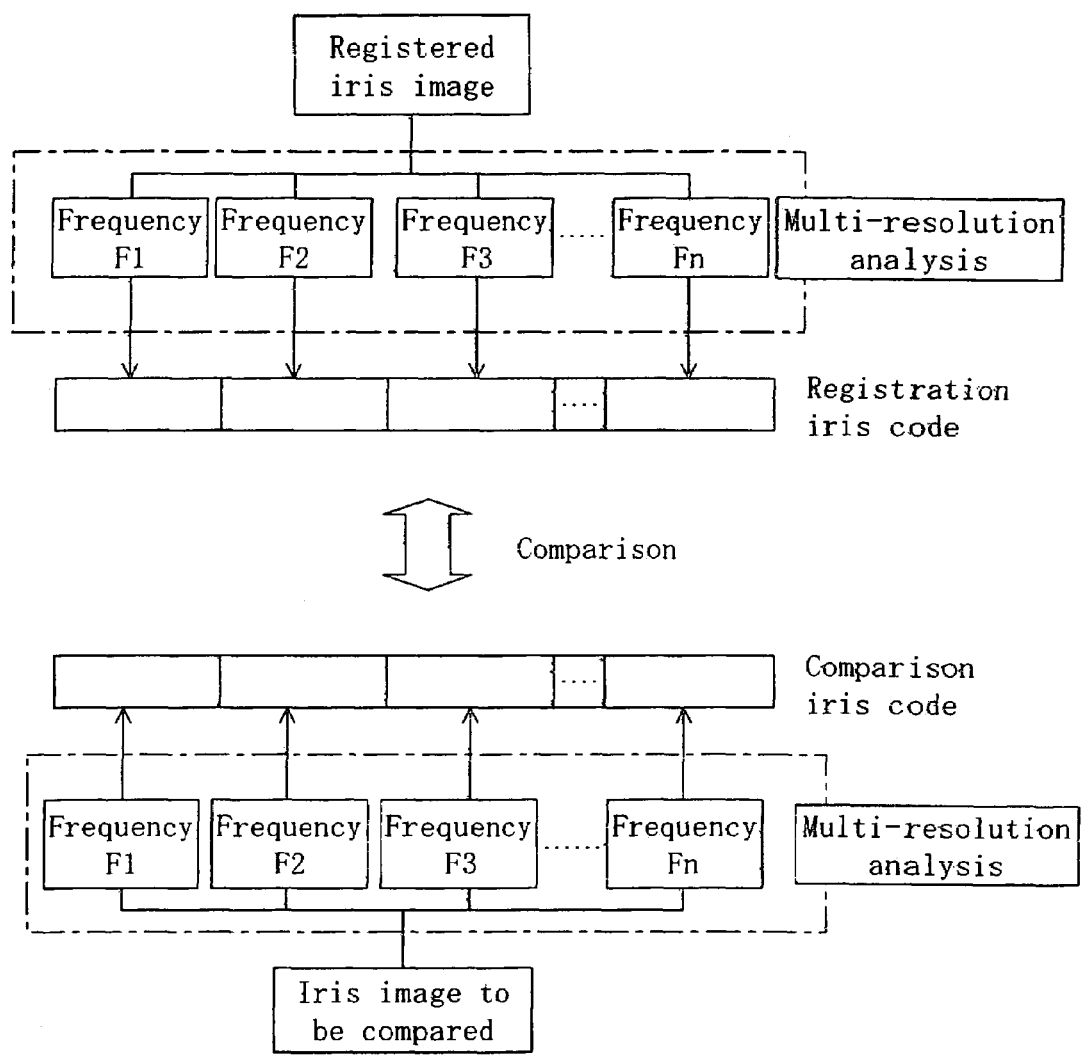
FIG. 24 is an illustration of conventional personal authentication.

Extraction of features is the same as that described in Embodiment 1 and thus description is omitted here. As shown in FIG. 23, extracted features are stored in iris DBs 12a to 12d separately by combination of analysis frequency bands.

During the authentication, as in Embodiments 1 and 2, the frequency bands for analysis are determined from an iris image taken. A combination of frequency bands identical to those for analysis is selected from the plurality of iris DB 12a to 12d shown in FIG. 23, and authentication is performed using the features stored in the selected iris DB in the manner described in Embodiment 1. Details of the authentication are omitted here.

By the above processing in this embodiment, substantially the same effects as those in Embodiment 1 can be obtained.

In this embodiment, the frequency bands for analysis were selected based on the upper-limit frequency of information contained in the image. Alternatively, authentication precision may be estimated in advance as in Embodiment 2, so that a combination of analysis frequencies can be selected based on the estimated authentication precision. In this case, the analysis frequency bands are not limited to those adjacent to one another (for example, F1, F2 and F3 in FIG. 22), but may be discrete ones (for example, F1 and F3 in FIG. 22) as discussed in Embodiment 2.

Thus, according to the present invention, degradation in authentication precision is suppressed even when authentication is done using iris images taken with image capture devices providing different resolutions. In addition, measures suitable for estimated authentication precision can be taken even when the information amount of a feature is low.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A personal authentication method using iris image, wherein during registration, acquired iris image is frequency-analyzed using a plurality of band-pass filters having different passbands from each other to generate a feature for each passband and register the feature, and wherein the method comprises the steps of:
   acquiring an iris image of a person to be authenticated using a first apparatus different in resolution performance from a second apparatus used during registration;
   selecting at least one passband from the passbands of the plurality of band-pass filters;
   performing frequency analysis for the acquired iris image of the person to be authenticated using at least one band-pass filter having the selected passband to generate a feature for the selected passband; and
   comparing the generated feature with the feature generated for the same passband during the registration to perform personal authentication,
   wherein the selection of the passband during the authentication is performed based on a resolution of the acquired iris image during the authentication.

2. The method of claim 1, wherein the resolution is determined from the acquired iris image itself.

3. The method of claim 2, wherein a size of an iris in the acquired iris image is used as the resolution.

4. The method of claim 3, wherein the size of the iris is determined based on the length of a circumference corresponding to the boundary between the iris and the pupil of the acquired iris image.

5. The method of claim 1, wherein the resolution is determined by predicting a size of the iris taken from information on the first apparatus.

6. A personal authentication method using iris image, wherein during registration, acquired iris image is frequency-analyzed using a plurality of band-pass filters having different passbands from each other to generate a feature for each passband and register the feature, and wherein the method comprises the steps of:
   acquiring an iris image of a person to be authenticated using a first apparatus different in resolution performance from a second apparatus used during registration;
   selecting at least one passband from the passbands of the plurality of band-pass filters;
   performing frequency analysis for the acquired iris image of the person to be authenticated using at least one band-pass filter having the selected passband to generate a feature for the selected passband; and
   comparing the generated feature with the feature generated for the same passband during the registration to perform personal authentication,
   wherein during registration, a plurality of combinations each including two or more features selected from the generated features are generated and authentication precision for each combination is calculated, and
   wherein the selection of the passband during the authentication is performed based on the calculated authentication precision,
   wherein the authentication precision is calculated using a distribution of authentication scores between identical persons and a distribution of authentication scores between different persons.

7. A personal authentication method using iris image, wherein during registration, acquired iris image is frequency-analyzed using a plurality of band-pass filters having different passbands from each other to generate a feature for each passband and register the feature, and wherein the method comprises the steps of:
   acquiring an iris image of a person to be authenticated using a first apparatus different in resolution performance from a second apparatus used during registration;
   selecting at least one passband from the passbands of the plurality of band-pass filters;
   performing frequency analysis for the acquired iris image of the person to be authenticated using at least one band-pass filter having the selected passband to generate a feature for the selected passband; and
   comparing the generated feature with the feature generated for the same passband during the registration to perform personal authentication,
   wherein an authentication precision during the authentication is estimated from the selected passband.

8. The method of claim 7, wherein the authentication precision is estimated using a distribution of authentication distances between identical persons and a distribution of authentication distances between different persons.

9. The method of claim 7, wherein whether or not the person to be authenticated should be finally authenticated is judged according to the estimated authentication precision.

10. The method of claim 7, wherein a right to be bestowed on the person to be authenticated after the authentication is controlled according to the estimated authentication precision.

11. The method of claim 7, wherein whether or not re-authentication is performed is judged according to the estimated authentication precision.

12. A personal authentication device using iris image, wherein during registration, acquired iris image is frequency-analyzed using a plurality of band-pass filters having different passbands from each other to generate a feature for each passband and register the feature, and wherein the device comprises:
   a first apparatus for acquiring an iris image of a person to be authenticated, the first apparatus being different in resolution performance from a second apparatus used during registration;
   means for selecting at least one passband from the passbands of the plurality of band-pass filters;
   means for performing frequency analysis for the acquired iris image by the first apparatus using at least one band-pass filter having the selected passband to generate a feature for the selected passband; and means for comparing the generated feature with the feature generated for the same passband during the registration to perform personal authentication, wherein the selecting means performs the selection of passband based on a resolution of the acquired iris image by the first apparatus.

13. A personal authentication device using iris image, wherein during registration, acquired iris image is frequency-analyzed using a plurality of band-pass filters having different passbands from each other to generate a feature for each passband and register the feature, and wherein the device comprises:

a first apparatus for acquiring an iris image of a person to be authenticated, the first apparatus being different in resolution performance from a second apparatus used during registration;

means for selecting at least one passband from the passbands of the plurality of band-pass filters;

means for performing frequency analysis for the acquired iris image by the first apparatus using at least one band-pass filter having the selected passband to generate a feature for the selected passband; and means for comparing the generated feature with the feature generated for the same passband during the registration to perform personal authentication, wherein during the registration, a plurality of combinations each including two or more features selected from the generated features are generated and authentication precision for each combination is calculated, and wherein the selecting means performs the selection of passband based on the calculated authentication precision, wherein the authentication precision is calculated using a distribution of authentication scores between identical persons and a distribution of authentication scores between different persons.

* * * * *